US006757140B1

(12) United States Patent
Hawwa

(10) Patent No.: US 6,757,140 B1
(45) Date of Patent: Jun. 29, 2004

(54) ELECTROSTATIC MICROELECTROMECHANICAL (MEM) MICROACTUATOR FOR PRECISE READ/ WRITE HEAD POSITIONING

(75) Inventor: Muhammad A. Hawwa, Fremont, CA (US)

(73) Assignee: Western Digital, Inc., Fremont, CA (US)

( * ) Notice: Subject to any disclaimer, the term of this patent is extended or adjusted under 35 U.S.C. 154(b) by 140 days.

(21) Appl. No.: 10/101,270

(22) Filed: Mar. 19, 2002

(51) Int. Cl.[7] .................................................. G11B 5/56
(52) U.S. Cl. ...................................................... 360/294.5
(58) Field of Search ........................... 360/294.5, 294.6, 360/294.4, 290; 310/329

(56) References Cited

U.S. PATENT DOCUMENTS

| 5,709,802 | A | 1/1998 | Furubata et al. ................. 216/2 |
| 5,959,808 | A | 9/1999 | Fan et al. ................. 360/294.3 |
| 5,982,585 | A | 11/1999 | Fan et al. ................. 360/294.6 |
| 6,072,665 | A | 6/2000 | Ferrari et al. ............ 360/245.9 |
| 6,088,194 | A | 7/2000 | Imaino et al. ........... 360/294.3 |
| 6,198,145 | B1 | 3/2001 | Ferrari et al. ................. 257/415 |
| 6,259,584 | B1 * | 7/2001 | Cini et al. ................ 360/294.6 |
| 6,262,868 | B1 * | 7/2001 | Arya et al. .................. 360/290 |
| 6,424,504 | B1 * | 7/2002 | Abe et al. ................. 360/294.4 |
| 6,469,415 | B2 * | 10/2002 | Jerman et al. .............. 310/309 |

FOREIGN PATENT DOCUMENTS

| EP | 955629 A1 * 11/1999 |
| EP | 1122720 A1 * 8/2001 |

* cited by examiner

Primary Examiner—Tianjie Chen

(57) ABSTRACT

A microelectromechanical (MEM) actuator incorporates a dual-stator design operated electrostatically in conjunction with a rotor to affect a fine positioning of a thin film magnetic read/write head. The substantial gain in the frequency response bandwidth greatly improves the performance and accuracy of the track-follow control for fine positioning of the thin film read/write head. The stators are comprised of a plurality of electrodes arranged perpendicularly along a plurality of stationary radial spokes, which are interleaving and oppositely disposed to the same plurality of moveable radial spokes formed on the rotor. A track-follow control commands a voltage to be supplied to the rotor and stators, thereby inducing an electrical potential field to generate an electrostatically attractive force for each pair of radial spokes between each of the stator and the rotor. These circumferentially acting forces result in a torque that causes the rotor on which the slider is mounted to displace in a pure clockwise or counterclockwise rotation about the center of the flexure.

16 Claims, 17 Drawing Sheets

(PRIOR ART)s

ELECTROSTATIC MICROELECTROMECHANICAL (MEM) MICROACTUATOR FOR PRECISE READ/WRITE HEAD POSITIONING

FIELD OF THE INVENTION

The present invention relates in general to data storage systems such as disk drives, and it particularly relates to a thin film read/write head for use in such data storage systems. More specifically, the present invention provides a new microelectromechanical (MEM) actuator incorporating a dual-stator design operated electrostatically in conjunction with a rotor to affect a fine positioning of the thin film magnetic read/write head. The substantial gain in the frequency response bandwidth greatly improves the performance and accuracy of the track-follow control for fine positioning of the thin film read/write head.

BACKGROUND OF THE INVENTION

In a conventional magnetic storage system, a thin film magnetic read/write head includes an inductive read/write transducer mounted on a slider. The read/write head is coupled to a rotary actuator magnet and a voice coil assembly by a suspension and an actuator arm positioned over a surface of a spinning magnetic disk. In operation, a lift force is generated by the aerodynamic interaction between the read/write head and the spinning magnetic disk. The lift force is opposed by equal and opposite spring forces applied by the suspension such that a predetermined flying height is maintained over a full radial stroke of the rotary actuator assembly above the surface of the spinning magnetic disk. The flying height is defined as the spacing between the surface of the spinning magnetic disk and the lowest point of the slider assembly. One objective of the design of magnetic read/write heads is to obtain a very small flying height between the read/write element and the disk surface. By maintaining a flying height close to the magnetic disk, it is possible to record short wavelength or high frequency signals, thereby achieving high density and high storage data recording capacity.

The slider of the read/write head incorporates an air bearing surface to control the aerodynamic interaction between the read/write head and the spinning magnetic disk thereunder. Air bearing surface (ABS) sliders used in disk drives typically have a leading edge and a trailing edge at which thin film read/write transducers are deposited. Generally, the ABS surface of a slider incorporates a patterned topology by design to achieve a desired pressure distribution during flying. In effect, the pressure distribution on the ABS contributes to the flying characteristics of the slider that include flying height, pitch, and roll of the read/write head relative to the rotating magnetic disk.

In a conventional magnetic media application, a magnetic recording disk is comprised of several concentric tracks onto which magnetized bits are deposited for data recording. Each of these tracks are further divided into sectors wherein the digital data are registered. As the demand for large capacity magnetic storage continues to grow at an ever increasing pace, the current trend in the magnetic storage technology has been proceeding toward a high track density design of magnetic storage media. In order to maintain the industry standard interface, magnetic storage devices increasingly rely on reducing track width as a means to increase the track density without significantly altering the geometry of the storage media.

As the track width becomes smaller, this poses several mechanical and electrical problems to the operation of magnetic disk drives. One such problem lies in its actuation and control feature, which is critical to the operation of a magnetic disk drive. In order to appreciate the magnitude of this problem, it is necessary to further describe the control aspect of a typical magnetic read/write head. In a conventional magnetic disk drive, a read/write head includes a transducer mounted on a slider. The slider in turn is attached to a stainless steel flexure. The flexure and the load beam to which the flexure is attached together form a suspension arm. The suspension arm is then connected to an actuator arm, which is driven by a voice coil motor (VCM) to cause it to rotate at its mid-length about a pivot bearing. The suspension arm exerts an elastic force to counteract the aerodynamic lift force generated by the pressure distribution on the ABS of the slider. The elastic force together with the stiffness of the suspension arm controls the stability of the actuator arm with respect to the pitch, roll, and yaw orientations. With respect to the control feature of the magnetic disk drive, during each read or write operation, there are usually two types of positioning controls: a track-seek control and a track-follow control.

A track-seek control is typically commanded when data are to be retrieved from or new data are to be written to a particular sector of a data track. Electronic circuitry incorporating an embedded feedback control logic supplies a necessary voltage to the VCM to actuate it to drive the actuator arm, onto which the read/write head is attached, to a target track. Thus, a track-seek control performs a low-resolution or coarse positioning of the read/write head from one data track to another data track.

Upon the completion of a track-seek control, subsequent data operation is typically confined to within the target track. In the earlier stage of the magnetic storage technology, a typical data track is sufficiently wide so that small variations in the position of the read/write head resulting from external disturbances to the track-seek control plant do not cause the position of the read/write head to exceed the prescribed control error allowance. Therefore, no further control implementation in addition to the track-seek control is necessary. This type of control implementation is usually referred to as a single-stage actuation, which incorporates the VCM in the feedback loop to effect a total positioning of the read/write head.

As the track width reduces as a means to increase the track density and hence the storage capacity of magnetic disk drives, the foregoing single-stage actuation encounters a significant degree of difficulty, chiefly due to the excessive control error of the track-seek control using the VCM in the loop. In particular, a single-stage actuation using the VCM for low-resolution positioning of the read/write head is found to be inadequate because the resulting control error due to external disturbances such as inertial shock loading or noise sometimes could cause the read/write head to unintentionally position over the adjacent tracks, thus possibly causing a magnetic field disturbance of the existing data thereon. In the worst case, the data disturbances can result in a total erasure of data in the adjacent tracks after several repetitive write operations, or data corruption upon reading.

Moreover, the VCM employed in a single-stage actuation is typically subjected to a mechanical resonance at a low natural frequency in the range of 2000–3000 Hz due to the flexibility of the suspension arm assembly. The response of the servo-system further limits the frequency bandwidth to about 1500 Hz. As a result, this low frequency bandwidth imposes a severe penalty on the frequency response of the single-stage actuation system in such a manner that the track-seek control is unable to rapidly respond to a change in the position of the read/write head, thus causing a significant degradation in the performance of the magnetic disk drive.

To address this technical difficulty, it is recognized that in order to maintain the position of the read/write head in a manner that it follows a concentric path within a narrow track width of a target data track, necessary corrections to the motion of the actuator arm are required. This provision is made possible by a track-follow control, which uses a feedback on the track error signal to make an appropriate correction to the motion of the actuator arm so as to maintain the position of the read/write head to follow a concentric path of the target data track within a prescribed control error allowance. Thus, in the presence of external disturbances, variations in the position of the read/write head would not cause the position of the read/write head to significantly deviate from the target position in excess of the control error allowance.

To implement this track-follow control plant, a microactuator is frequently incorporated in the control feedback loop. Various types of microactuator have been proposed, including piezoelectric (PZT) actuators, electrostatic microelectromechanical systems (MEMS), and electromagnetic MEMS. By adjusting the voltage supplied to the microactuator, the track-follow control makes necessary corrections to the position of the actuator arm in the presence of external disturbances so that the read/write head is maintained to follow the target data track with a reasonable degree of precision. The implementation of a new, separate track-follow control for high-resolution positioning in addition to the usual track-seek control for low-resolution positioning as in the single-stage actuation is typically referred to as a dual-stage actuation, which constitutes the predominant control system employed in high capacity magnetic disk drives.

There currently exist a number of different microactuator designs in use for high-resolution positioning of read/write heads in high capacity magnetic disk drives. One such widely used conventional microactuator design is based on an electrostatically coupled rotor-stator concept. In principle, the rotor of the example conventional microactuator is physically connected to the outer stator by means of a plurality of elastic springs.

Moreover, the rotor is also electrostatically coupled to the outer stator by means of a plurality of radial spokes extending outwardly from the rotor and interleaving with the same plurality of similarly featured radial spokes extending inwardly from the stator. When a track-follow control plant commands a voltage to be sent to the example conventional microactuator in order to make a necessary correction to the motion of the actuator arm, an electrostatic potential field is induced within the radial spokes of the rotor and stator. By controlling the voltage polarity, an electrostatically attractive force can be generated between each pair of radial spokes between the rotor and stator. These circumferentially acting forces effectively result in a torque that causes a rotational motion of the rotor on which the slider containing the read/write head is mounted.

Notwithstanding the ability to achieve the track-follow control objective, the conventional electrostatically coupled rotor-stator microactuator design suffers a number of shortcomings that may offset the advantages it offers. These shortcomings may manifest into a number of problems as follows:

Because of the elastic spring connection of rotor to the stator and the mass of the rotor itself, the conventional microactuator of electrostatically coupled rotor-stator design possesses some natural frequencies of vibration. In particular, these natural frequencies are of low values because of the relatively substantial length of the elastic springs connecting the rotor to the stator. These low natural frequencies of vibration can easily be excited by an inertial force due to a sudden motion as commanded by the track-follow control, thereby rendering the microactuator susceptible to shock and vibration. Thus, in order to minimize this susceptibility to shock and vibration, the track-follow control may have to command a more gradual motion to reduce the inertial force loading. In so doing, the track-follow control performance may be degraded because of the reduced speed of actuation.

Furthermore, as the conventional microactuator of electrostatically coupled rotor-stator design is subjected to a typical excitation force during operation, the ensuing vibration of the rotor connected to the elastic springs manifests into an uneven oscillating forces at the spring supports on the outer stator. These forces may act transversely to the axis of the suspension arm assembly to which the stator is attached and present themselves as potential excitation forces to the suspension arm assembly. If these forces are sufficiently large and possess the excitation frequency near the natural frequency of the suspension arm, a resonant vibration of the suspension arm assembly would ensue, thereby causing an undesirable disturbance problem for the track-follow control system.

Yet another problem associated with the conventional electrostatically coupled rotor-stator microactuator design lies in its inherent non-linearity. The non-linearity is a manifestation of the force dependence on the voltage and the inverse dependence of the electrostatic force on the gap/engagement between the fingers. As in most physical systems, linearity is a highly desired virtue since it greatly simplifies the electromechanical conversion process. Furthermore, most modern control logics are built upon the premise of linearity in the system to be controlled. Hence, the non-linearity in the conventional electrostatically coupled rotor-stator microactuator design adds a significant degree of complexity in the operation and control of the conventional microactuator.

In light of the foregoing shortcomings with the conventional microactuator of electrostatically coupled rotor-stator design, it is recognized that a further enhancement in the microactuator design for a fine positioning of the read/write head is needed. Preferably, the enhanced microactuator would have a greater frequency response than the convention microactuator without adversely affecting the load beam vibration mode of the suspension arm assembly. Moreover, the enhanced microactuator design should have an enhanced linearity in order to reduce the complexity of the mechanical actuation.

SUMMARY OF THE INVENTION

In order to solve the foregoing difficulties, it is a feature of the present invention to provide a new enhanced microelectromechanical (MEM) actuator design for fine positioning of the read/write head during a track-follow control operation. The enhanced microactuator according to the present invention is designed to be used in a collocated dual-stage actuation servo system that substantially boosts the servo frequency bandwidth to enhance the track-seek and track-follow controls for an extremely high capacity magnetic storage devices. The present invention features an electrostatic MEM microactuator that is designed to rotate in response to a track-follow control voltage command.

According to a preferred embodiment, the electrostatic MEM microactuator of the present invention is comprised of a rotor electrostatically coupled to two stators arranged in an alternating manner. The stators are further comprised of a plurality of electrodes arranged perpendicularly along a plurality of stationary radial spokes, which are interleaving and oppositely disposed to the same plurality of moveable radial spokes formed on the rotor.

A track-follow control commands a voltage to be supplied to the rotor and stators, thereby inducing an electrical potential field to generate an electrostatically attractive force for each pair of radial spokes between each of the stator and the rotor. These circumferentially acting forces result in a torque that causes the rotor on which the slider is mounted to displace in a pure clockwise or counterclockwise rotation about the center of the flexure. The enhanced microactuator design of the present invention demonstrates the following improvements:

1. The use of two stators alternating with a rotor results in a greater elastic stiffness of the microactuator of the present invention due to the shorter spring length, thus substantially raising the natural frequencies of rotor. The increased natural frequencies translates into an improved frequency response of the microactuator of the present invention, thus enabling it to rapidly achieve a precise positioning of the read/write head;
2. The increased stiffness of the elastic connection of the rotor to the stators greatly diminishes the susceptibility of the microactuator of the present invention to shock and vibration, and further reduces excitation forces to the suspension arm assembly in the load beam modes;
3. Dividing the motor into quadrants to act in a pull hard—pull easy mechanism could enhance the motor linearity. In the current design, the doubling of the number of quadrants as a result of the circular symmetry of the microactuator of the preferred embodiment as compared to the conventional microactuator effectively enhances the linearity of the motor, thus reducing the complexity of the operation and control thereof.
4. The enhanced microactuator design of the preferred embodiment preserves the industry standard interface with a conventional suspension arm assembly without the necessity for a modification thereof, thus, rendering the performance of the enhance microactuator of the present invention virtually unaffected by various different form factors of the slider/suspension assembly such as Pico and Femto form factors.

A number of alternative embodiments are derived from the aforementioned novelties of the present invention. One such alternative embodiment includes a different physical arrangement of electrodes on non-equidistant radial spokes extending from the two stators with the outer stator closer to the rotor than the inner stator, thus resulting in combined electrostatically attractive forces between the radial spokes of the rotor and stators, which lead to a pull hard—pull easy arrangement instead on a pull only mechanism. As a result, the linearity of this microactuator could be further enhanced.

Another alternative embodiment of the present invention pertains to a microactuator employing a plurality of rotors and stators positioned relative to one another in an alternating arrangement. Thus, the resultant torque that causes a rotation of the slider is created by a combination of a series of forces acting between the rotors and stators.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
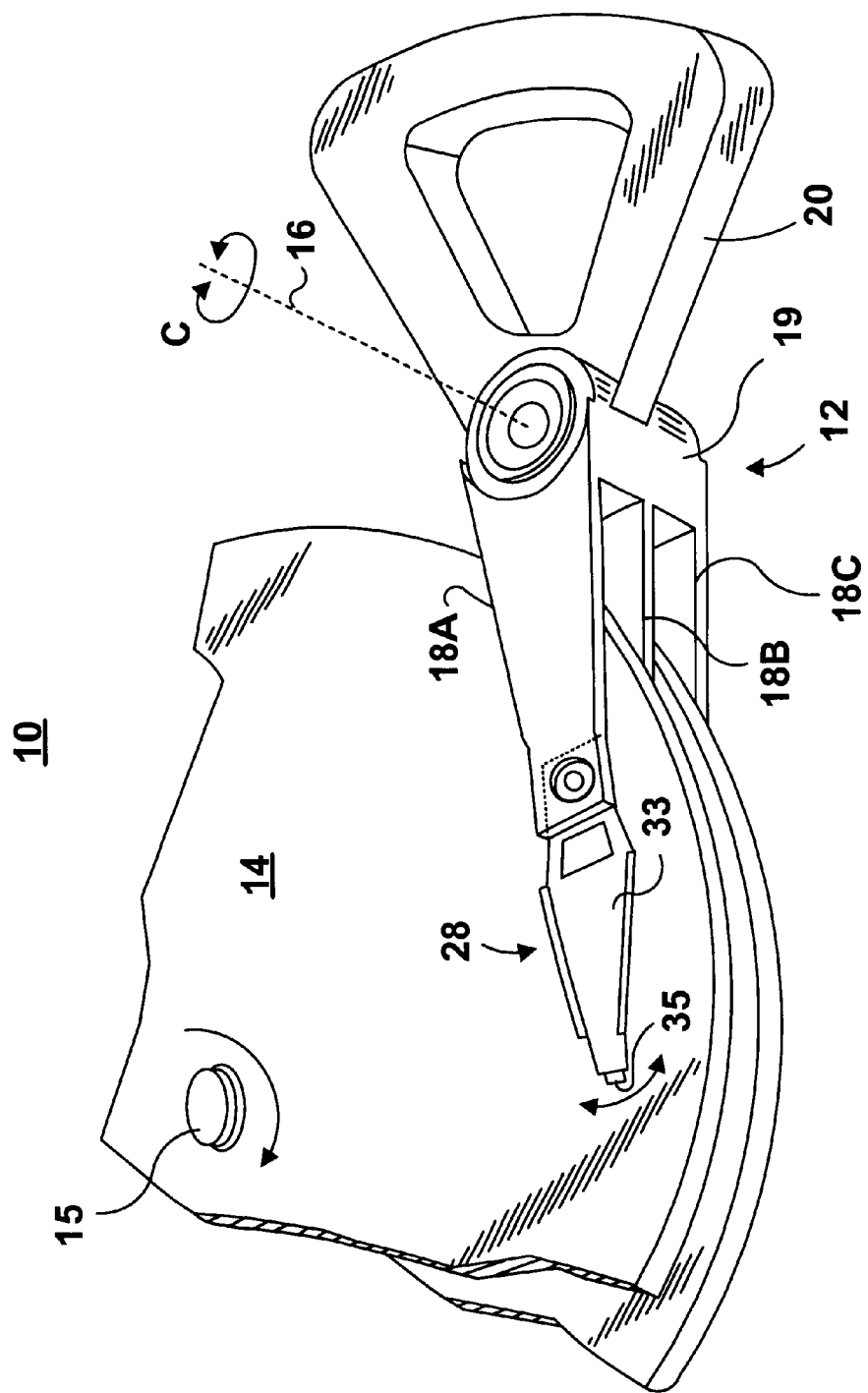
FIG. 1 is a fragmentary perspective view of a data storage system including the head gimbal assembly, made according to a preferred embodiment of the present invention.

FIG. 1 illustrates a disk drive 10 comprised of a head stack assembly 12 and a stack of spaced apart smooth media magnetic data storage disks or smooth media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor or voice coil motor (VCM) 20 attached to the block 19 in a position diametrically opposite to the actuator arms 18A, 18B, 18C. The VCM 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14. The actuator arms 18A, 18B, 18C are identical in design and geometry. Therefore, only one of these actuator arms, 18A, is further referenced herein, with the understanding that this reference also applies to the plurality of the actuator arms 18A, 18B, 18C.

Figure 2:
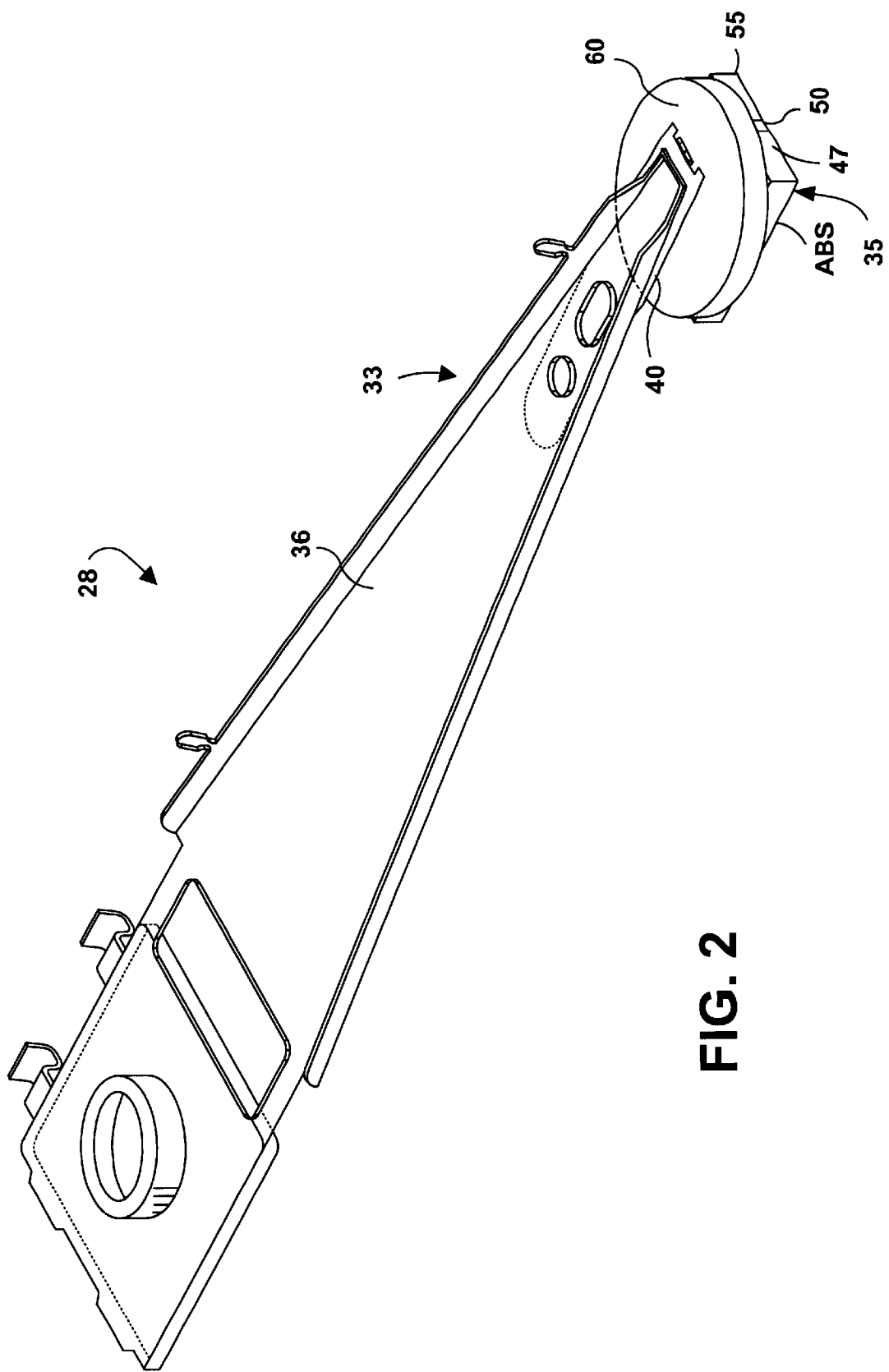
FIG. 2 is a perspective top view of the head gimbal assembly of FIG. 1 comprised of a suspension, a slider, and a microactuator, made according to the present invention.
Figure 3:
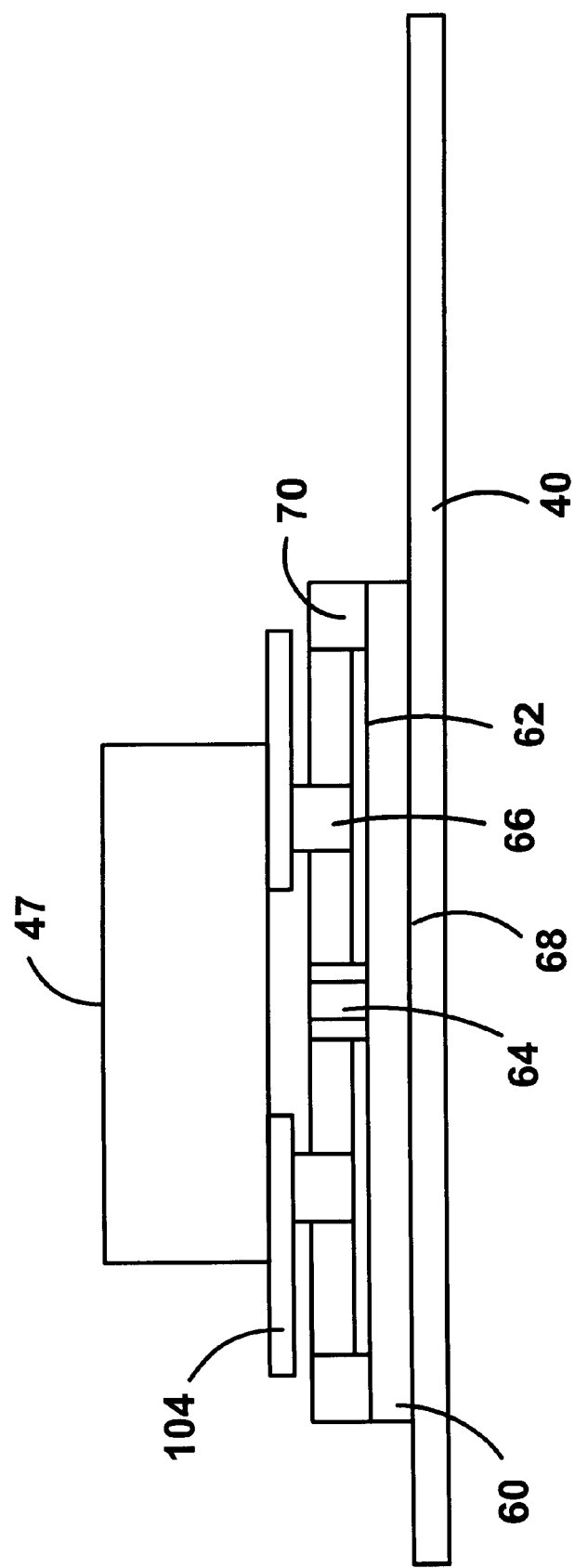
FIG. 3 is a cross-sectional view of the suspension/slider assembly of FIG. 2 showing a suspension, a slider mounted on a plurality of mounting pads, which are attached to the microactuator, made according to a preferred embodiment of the present invention.

According to a preferred embodiment of the present invention, a head gimbal assembly (HGA) 28 is secured to each of the actuator arms, for instance 18A. With reference to FIG. 2, the HGA 28 is comprised of a suspension 33, a microactuator 60 of the present invention, and a read/write head 35. The suspension 33 includes a resilient load beam 36 and a flexure 40. With further reference to FIG. 3, the microactuator 60 of the present invention is bonded to the flexure 40 on its base 68, and supports a read/write head 35 via a protective cap 104 attached on its underside. The read/write head 35 is formed of a slider 47 secured to the microactuator 60 of the present invention, and a read/write magnetic sensor/transducer (or element) 50 supported by the slider 47. The read/write element 50 is mounted at the trailing edge 55 of the slider 47 so that its forwardmost tip is generally flush with the air bearing surface (ABS) 65 of the slider 47.

Figure 4:
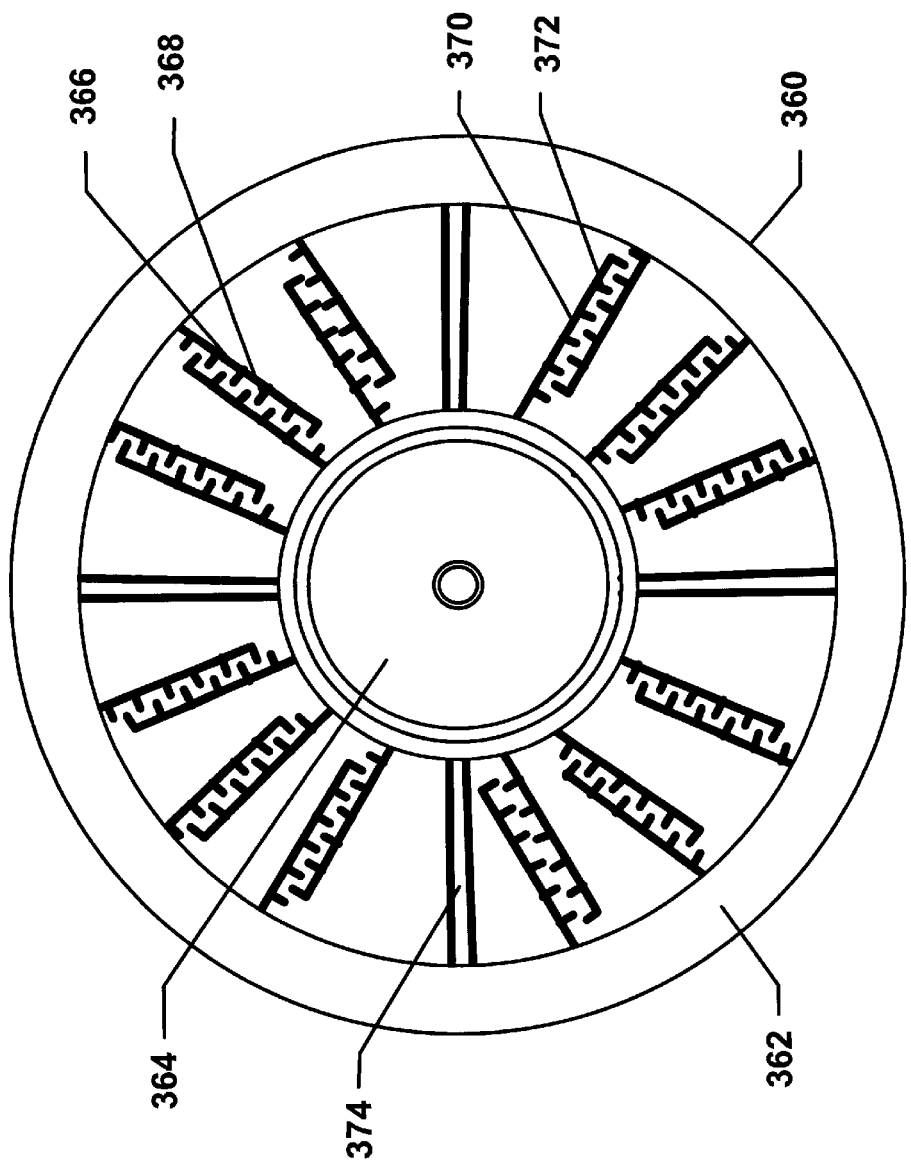
FIG. 4 is a bottom view of a conventional microactuator comprised of a stator and a rotor.

In order to appreciate the novelty and advantages of the present invention, it is necessary to describe a conventional microactuator of a prior art so as to provide a clear, distinct contrast with the microactuator 60 of the present invention. In connection with FIG. 4, a conventional microactuator 360 of a prior art is comprised of an outer stator 362 and an inner rotor 364.

The outer stator 362 is generally formed of a circular ring and further is positioned stationary with respect to the head gimbal assembly 28. Extending radially inward from the inner wall of the stator 362 are a plurality of stator radial spokes 366. Each of the stator radial spokes 366 is further comprised of a plurality of electrostatically charged stator electrodes 368 mounted transversely at equidistant on the stator radial spokes 366. These electrostatic charge carrying stator electrodes 368 form an array that resembles a comb, henceforth will be referred herein to as comb-like stator fingers 368.

The inner rotor 364 is formed of a circular mass onto which the slider 47 is mounted and is rotatable with respect to the head gimbal assembly 28. Extending radially outward from the rotor 364 is a plurality of rotor radial spokes 370 interleaving with the stator radial spokes 366. Each of the rotor radial spokes 370 is further comprised of a plurality of electrostatically charged rotor comb-like fingers 372 mounted transversely at equidistant on the rotor radial spokes 370 and alternating with the comb-like stator fingers 368. The inner rotor 364 is elastically attached to the inner wall of the outer stator 362 via a plurality of elastic springs 374.

The problems and concerns associated with the conventional microactuator 360 of the prior art are now described. Among the disadvantages of the conventional microactuator 360 of the prior art is due to the elastic springs 374 that connect the inner rotor 364 to the inner wall of the outer stator 362. Because of the stiffness of the elastic springs 374 and the mass of the inner rotor 364, there exist a plurality of natural frequencies of vibration associated with the inner rotor 364.

Furthermore, it is a well-known fact that the extensional stiffness of an elastic spring is inversely proportional to the length of the elastic spring, while the flexural stiffness varies inversely with the cubic power of the length. Since the length of the elastic springs 374 is of a substantial measure, the stiffness associated thereof is expected to be low. Hence, the natural frequencies of the inner rotor 364 are also low accordingly. The low natural frequencies of the rotor 364 pose several problems with the operation and control of the conventional microactuator 360 of the prior art.

One such problem is the susceptibility of the conventional microactuator 360 of the prior art to shock and vibration which in turn may result in a performance degradation. For instance, if the disk drive 10 or the head gimbal assembly 28 is subjected to a shock or harmonic load, this shock or harmonic load would excite one or more natural modes of vibration of the inner rotor 364, causing it to oscillate together with the slider 47 mounted to it. This oscillation consequently may cause the track-follow control plant to improperly execute its error correction to maintain the desired position of the read/write element 50 within a target track.

In the worst case, this oscillation may subsequently cause the read/write element 50 to deviate from its intended position on a target data track of the magnetic disk 14 to an adjacent data track, thereby causing an unintended disturbance of the magnetic material therein. This phenomenon is also referred to as side-writing. The side-writing action may, in the worst case, result in an accidental complete erasure of data in the adjacent track. Thus, without data verification and correction in between each write operation, the data quality of a magnetic disk would be significantly compromised. Moreover, the oscillation of the inner rotor 364 may also impart a lateral dynamic side force to the flexure 40 of the suspension 33, thereby causing a vibration of the suspension 33 in a flexural load beam mode. This flexure load beam mode vibration may also lead to the same consequence of the foregoing side-writing over a larger range of adjacent data tracks.

Furthermore, because of the relatively low natural frequencies of the inner rotor 364, the track-follow control system would have to be designed accordingly so as not to impart an undesirable shock load to the inner rotor 364. In so doing, the track-follow control system would have to command a gradual voltage change to effect the position of the slider 47, hence also inner rotor 364. This, in effect, slows down the frequency response and the ability of the track-follow control system to seek a target track, thereby significantly degrading the performance of the disk drive 10 which is typically measured by its seek time.

Yet another issue with the conventional microactuator 360 of the prior art is its inherent non-linearity in the actuation forces that cause the rotation of the inner rotor 364. This non-linearity is directly proportional to the applied voltage and inversely proportional to the separation gap between the outer stator 362 and the inner rotor 364, which is spanned by the elastic springs 374. The non-linearity is usually not a desirable feature of any microactuator device, because the associated forces and motions are often described by a complex relationship with the applied voltage, thus introducing an uncertainty in the track-follow control of the conventional microactuator 360 of the prior art.

In light of the foregoing problems and issues associated with the conventional microactuator 360 of the prior art, it is recognized that in order to increase the natural frequencies of the inner rotor 364, the length of the elastic springs 374 would have to decrease. However, in so doing, the size and hence the mass of the inner rotor 364 would also have to increase, thus negating the attempt to increase the natural frequencies by decreasing the length of the elastic springs 374. A similar argument could be made with respect to the attempt to reduce the non-linearity of the conventional microactuator 360 of the prior art.

Thus, in an effort to attain an enhanced microactuator design based on electrostatically coupled stator-rotor concept, it is a novelty and feature of the present invention to introduce the enhanced microactuator 60 of the preferred embodiment that utilizes a novel two-stator design concept which effectively resolves all the foregoing problems and concerns with the conventional microactuator 360 of the prior art by reducing the length of the elastic springs 374 and the separation between the outer stator 362 and the inner rotor 364 without affecting the mass of the inner stator 364.

Figure 5:
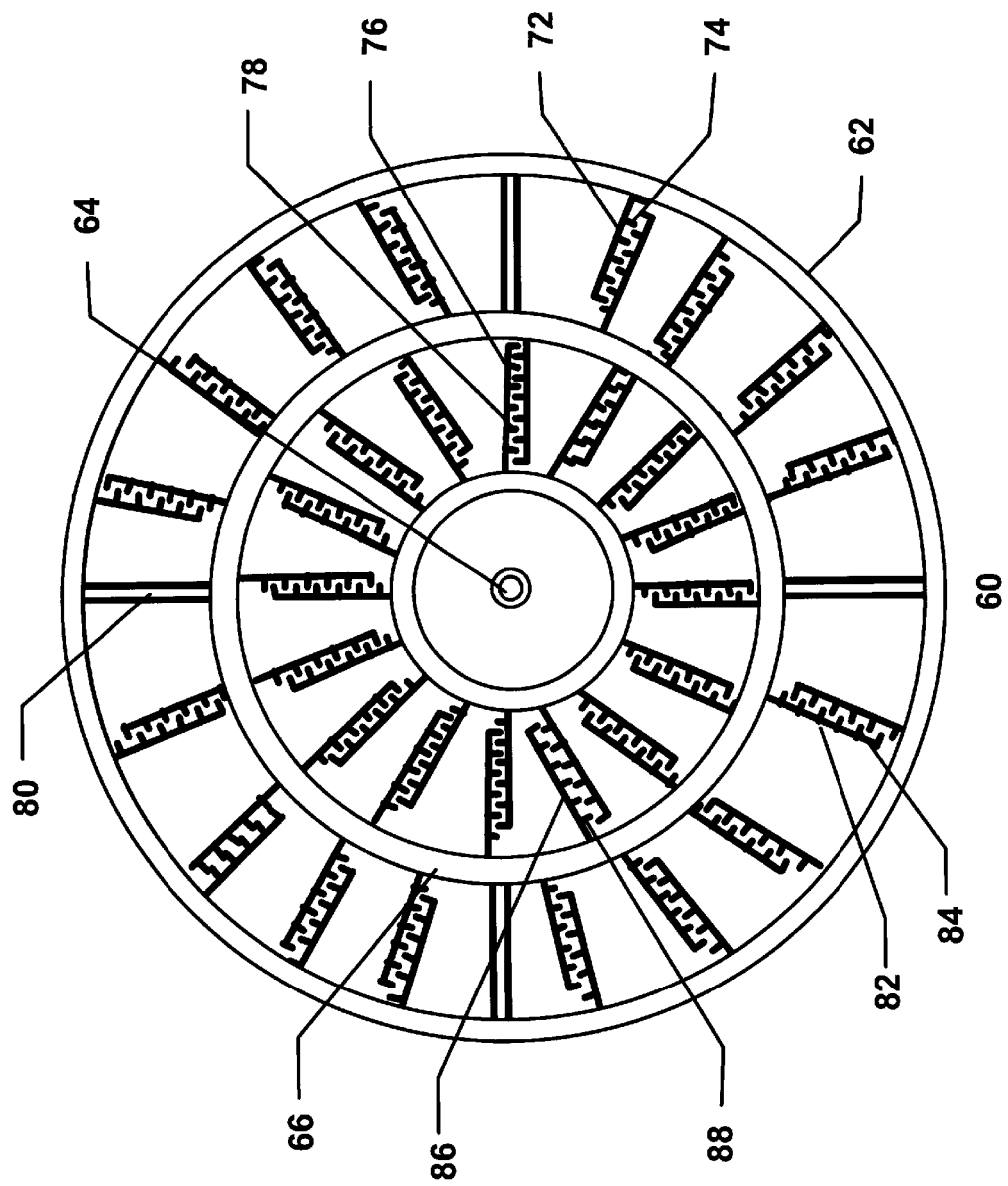
FIG. 5 is a bottom view of the microactuator of FIG. 2 comprised of two stators and a rotor positioned midway between the two stators and electrostatically coupled by radial spokes of equal lengths having a plurality of eclectrostatically charged comb-like fingers, made according to a preferred embodiment of the present invention.

Referring now to FIG. 5, in accordance with a preferred embodiment of the present invention, the microactuator 60 is comprised of an outer stator 62, an inner stator 64, and a rotor 66 positioned midway and concentrically between the outer stator 62 and the inner stator 64. With further reference to FIG. 3, the outer stator 62 is generally made of a U-shaped plate, with its vertical "legs" forming a circular rim 70 circumscribing the horizontal circular base 68. The base of the outer stator 68 is bonded to the flexure 40 of the suspension 33, hence is stationary with respect to the head gimbal assembly 28.

Extending radially inwardly from the inner wall of the circular rim 70 of the outer stator 62 are a plurality of outer stator radial spokes 72 equally spaced circumferentially except at the 12, 3, 6, and 9 o'clock positions. Further, the outer radial spokes 72 terminate in a close proximity to the outer wall of the rotor 66. Each of the outer stator radial spokes 72 is further comprised of a plurality of electrostatically charged outer stator fingers 74 mounted transversely and equally spaced on one side of the outer stator radial spokes 72. With reference to FIG. 5, the electrostatic charge carrying outer stator fingers 74 form an array that resembles a comb pointing in a clockwise direction.

With reference to FIGS. 3 and 5, the inner stator 64 is generally formed of a circular disk located at the innermost and fixed to the circular base 68 of the outer stator 62 of the microactuator 60 of the preferred embodiment. A plurality of inner stator radial spokes 76 extend radially outward therefrom and are equally spaced circumferentially at the periphery thereof. Further, the inner stator radial spokes 76 terminate in a close proximity to the inner wall of the rotor 66.

The number of inner stator radial spokes 76 is generally the same as the number of outer stator radial spokes 72, with the understanding that these numbers could also be made different without deviating from the intent of the present invention. Each of the inner stator radial spokes 76 is further comprised of a plurality of electrostatically charged inner stator fingers 78 mounted transversely and equally spaced on one side of the inner stator radial spokes 76. The electrostatic charge carrying inner stator fingers 78 form an array that resembles a comb pointing in a clockwise direction.

With reference to FIGS. 3 and 5, the rotor 66 is generally formed of a circular ring positioned midway and concentrically between the outer stator 62 and inner stator 64. The rotor 66 is suspended above the circular base 68 and elastically connected to the outer stator 62 by four elastic springs 80 that are attached at one end to the outer wall of the rotor 66 and at the other end to the circular rim 70 of the outer stator 62 at the 12, 6, 3, and 9 o'clock positions. It should be understood that the number of elastic springs 80 can be different from four without departing from the teaching of the present invention. In this manner, the rotor 66 can be made to rotate with respect to the head gimbal assembly 28 by deflecting the elastic springs 80. Attached to the outer wall of the rotor 66 are a plurality of outward rotor radial spokes 82 that extend radially outward and alternate with the outer stator radial spokes 72 in a close proximity.

Further, the outward rotor radial spokes 82 terminate in a close proximity to the inner wall of the circular rim 70 of the outer stator 62. In general, the number of the outward rotor radial spokes 82 is the same as the number of the outer stator radial spokes 72. Each of the outward rotor radial spokes 82 is further comprised of a plurality of electrostatically charged outward rotor fingers 84 mounted transversely and equally spaced on one side of the outward rotor radial spokes 82. The electrostatic charge carrying outward rotor fingers 84 form an array that resembles a comb pointing in a counterclockwise direction and alternate in between the outer stator fingers 74.

Similarly, attached to the inner wall of the rotor 66 are a plurality of inward rotor radial spokes 86 that extend radially inward and alternate with the inner stator radial spokes 76 in a close proximity. Further, the inward rotor radial spokes 86 terminate in a close proximity to the inner stator 64. In general, the number of the inward rotor radial spokes 86 is the same as the number of the inner stator radial spokes 76. Each of the inward rotor radial spokes 86 is further comprised of a plurality of electrostatically charged inward rotor fingers 88 mounted transversely and equally spaced on one side of the inward rotor radial spokes 86. The electrostatic charge carrying inward rotor fingers 88 form an array that resembles a comb pointing in a counterclockwise direction and alternate in between the inner stator fingers 78.

Furthermore, with reference to FIG. 3, a protective cap 104 is attached to the rotor 66 on one of its sides, while the other side supports the slider 47. The protective cap 104 generally is formed of a circular washer having an outer diameter approximately equal to the diameter of the outer stator 62 and an inner diameter inscribed the width of the slider 47 in the transverse direction of the suspension arm 33. The protective cap 104 is rested upon the rotor 66 and raised above the outer stator rim 70 to enable it and the slider 47 to freely rotate in unison with the rotor 66 during a track-follow control actuation. When viewed from the underside of the slider 47, the protective cap 104 provides a complete areal coverage of the rotor 66. This areal coverage provided by the protective cap 104 is designed to prevent micro-contamination. This micro-contamination is due to a large electrostatic potential field existing among the various fingers 74, 78, 84, and 88 that tends to promote dust particles to collect therein, thereby potentially causing short-circuit failures and/or mechanical binding of the rotor 66.

In order to appreciate the advantages afforded by the novel features of the preferred embodiment of the present invention, it is necessary to further describe the functionality of the preferred embodiment in connection to FIGS. 6 through 11.

During a track-seek control, the actuator arm 18A is driven by the VCM 20 to provide a coarse positioning of the read/write head 35 by pivoting about a pivot bearing 21 about the axis 16. Upon arriving at a desired target data track, the track-follow control takes over the primary function of the magnetic disk drive 10 by maintaining the read/write head 35 to follow the target data track in a high resolution mode, which is also known as fine positioning.

An active control system is deployed by means of an embedded logic to enable the track-follow control function. The track-follow control system senses the deviation in the position of the read/write head 35 relative to the track position 26. A correction is made to reduce this deviation by the track-follow control, which commands a necessary voltage to the microactuator 60 to cause it to rotate along with the slider 47, thus restoring the desired position of the read/write head 35.

Figure 6:
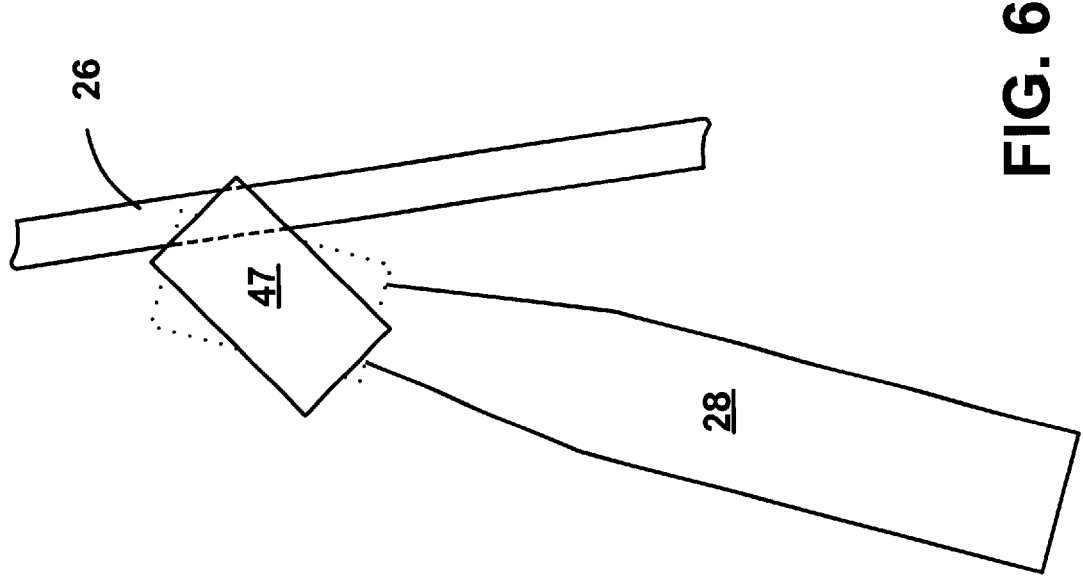
FIG. 6 is a bottom view of the head gimbal assembly of FIG. 2 before and after a track-follow control actuation.

This operation is illustrated in FIG. 6. In particular, FIG. 6 shows that the error correction requires a clockwise rotation of the slider 47 as viewed from the ABS. It should be understood that a counter clockwise rotation of the slider 47 may be also required as needed to bring about a reduction in the error of the position of the read/write head 35.

Figure 7:
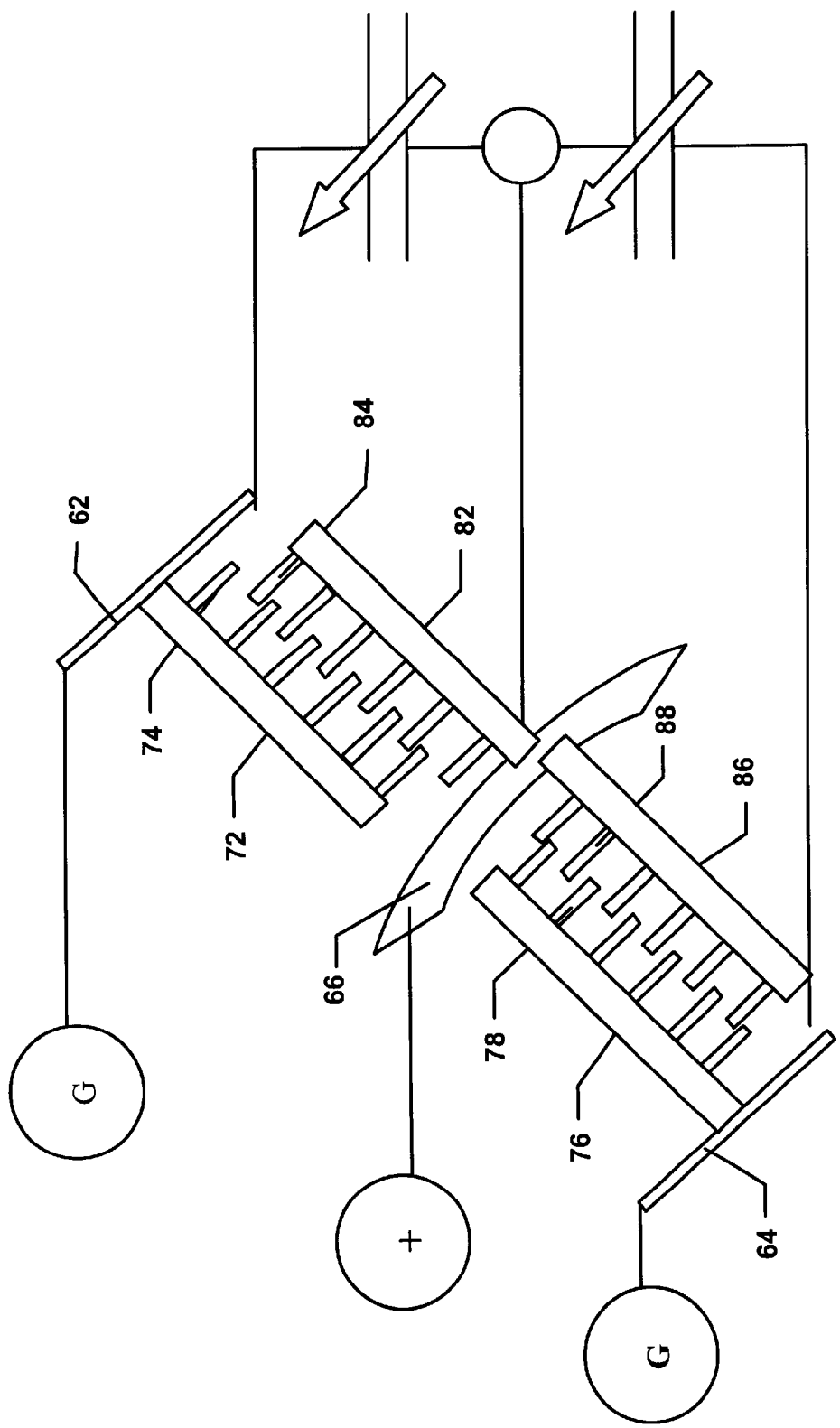
FIG. 7 illustrates an electrical diagram of the radial spokes of the microactuator of FIG. 5, made according to a preferred embodiment of the present invention.

With reference to FIG. 7, generally, the rotor 66 is maintained at a positive polarity, while the outer stator 62 and inner stator 64 are maintained at ground. When a track-follow control commands a voltage to be sent to the microactuator 60 of the preferred embodiment, the voltage generates a current that flows through both the outward rotor radial spokes 82 and the inward rotor radial spokes 86 and in turn through the outward rotor fingers 84 and inward rotor fingers 88. This current flow generates an electrostatic potential field that permeates in the air gap among the various fingers 74, 78, 84, and 88, as a result of the voltage potential difference between the rotor 66 and the outer stator 62 and inner stator 64.

Figure 8:
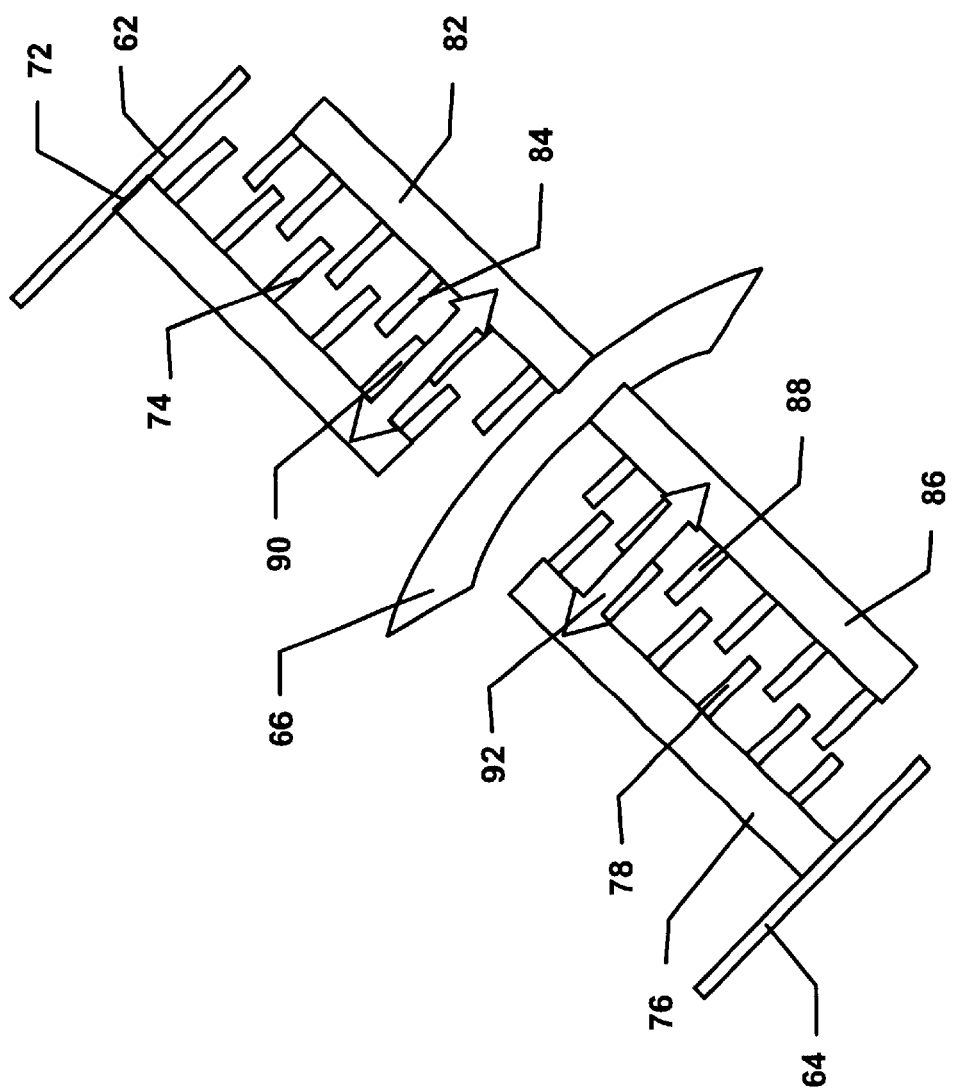
FIG. 8 is a diagram illustrating electrostatic transverse forces engaged between the comb-like fingers attached to the radial spokes of the microactuator of FIG. 5, made according to a preferred embodiment of the present invention.

With reference to FIG. 8, the electrostatic potential field existing between the various fingers 74, 78, 84, and 88 induces an electrostatic force 90 between the each pair of the outer stator radial spokes 72 and the outward rotor radial spokes 82, and an electrostatic force 92 between each pair of the inner stator radial spokes 76 and the inward rotor radial spokes 86. The electrostatic forces 90 and 92 acting in the circumferential direction of the rotor 66 are attractive in nature to work on adjusting the track-follow control voltage command accordingly to set up different electrostatic charges among the various fingers 74, 78, 84, and 88.

Figure 9:
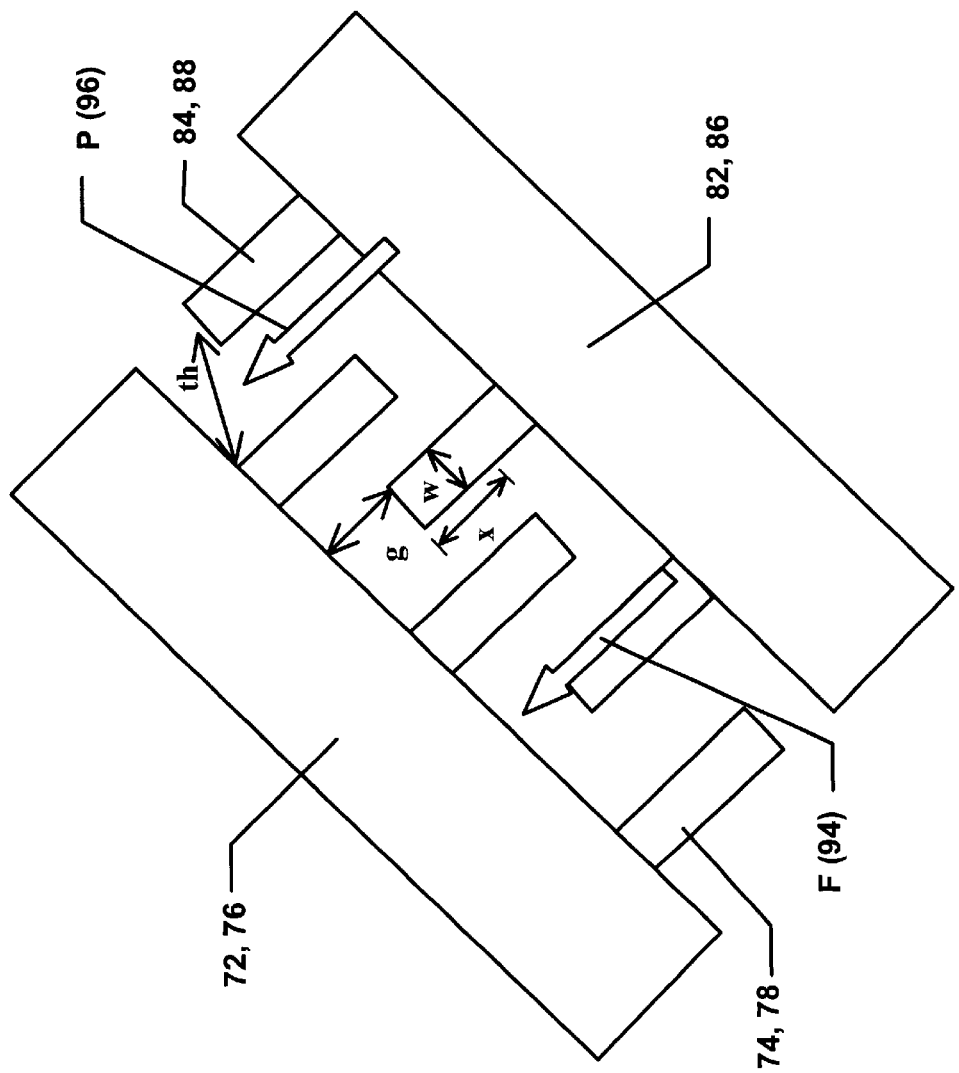
FIG. 9 illustrates an electrostatic force concept of the microactuator of FIG. 5, made according to a preferred embodiment of the present invention.

With reference to FIG. 9, the physical principle of the creation of the electrostatic forces 90 and 92 is described in further details. Upon a voltage command from the track-follow control, a voltage potential difference exists between the rotor 66 and the outer stator 62 and inner stator 64. This potential difference sets up an electrostatic potential field in the permeable air gap among the various fingers 74, 78, 84, and 88, which induces a plurality of the electrostatic forces 90 and 92 between the outer stator 62 and the rotor 66, and between the inner stator 64 and the rotor 66, respectively. Each of the electrostatic forces 90 and 92 is further comprised of two force mechanisms: one due to the electrostatic potential field in the fingers 74, 78, 84, and 88; and the other due to the electrostatic potential field in the outer stator radial spokes 72, the inner stator radial spokes 76, the outward rotor radial spokes 82, and the inward rotor radial spokes 86. These force mechanisms may be referred to as finger actuation force 94 and parallel-plate actuation force 96, respectively. The finger actuation force 94 is defined according to the formula:

$$F=[0.5*\_0*th*v^2]/g \tag{1}$$

where F is the finger actuation force 94, _0 is a physical constant that defines air permissibility (permittivity), th is the thickness of the fingers 74, 78, 84, 88 in a direction normal to the paper, v is the applied voltage, and g is the separation gap between the outer stator radial spokes 72 or inner stator radial spokes 76 and the top of the outward rotor fingers 84 or inward rotor fingers 88.

Similarly, the parallel-plate actuation force 96 is defined according to the formula:

$$P=(0.5*\_0*w*th*v^2)/(g-x)^2 \tag{2}$$

where P is the parallel-plate actuation force 96, w is the width of the outward rotor fingers 84 or inward rotor fingers 88, x is the engagement distance between the outward rotor fingers 84 or the inward rotor fingers 88 and the outer stator fingers 74 or inner stator fingers 78, and the remaining parameters are the same as the aforementioned definition.

It is evident from the formulas (1) and (2) that both the finger actuation force 94 and the parallel-plate actuation force 96 comprising the electrostatic force 90 or 92 are non-linear with respect to the voltage command from the track-follow control. Furthermore, the finger actuation force 94 and the parallel-plate actuation force 96 are inversely proportional to second order power of the separation gap between the outer stator radial spokes 72 or inner stator radial spokes 76 and the top of the outward rotor fingers 84 or inward rotor fingers 88. Thus, to generate an electrostatic force 90 and 92, the various fingers 74, 78, 84, and 88 are brought closer together during a track-follow control actuation. Conversely, when track-follow control is not needed, the various fingers 74, 78, 84, and 88 are sufficiently separated.

Figure 10:
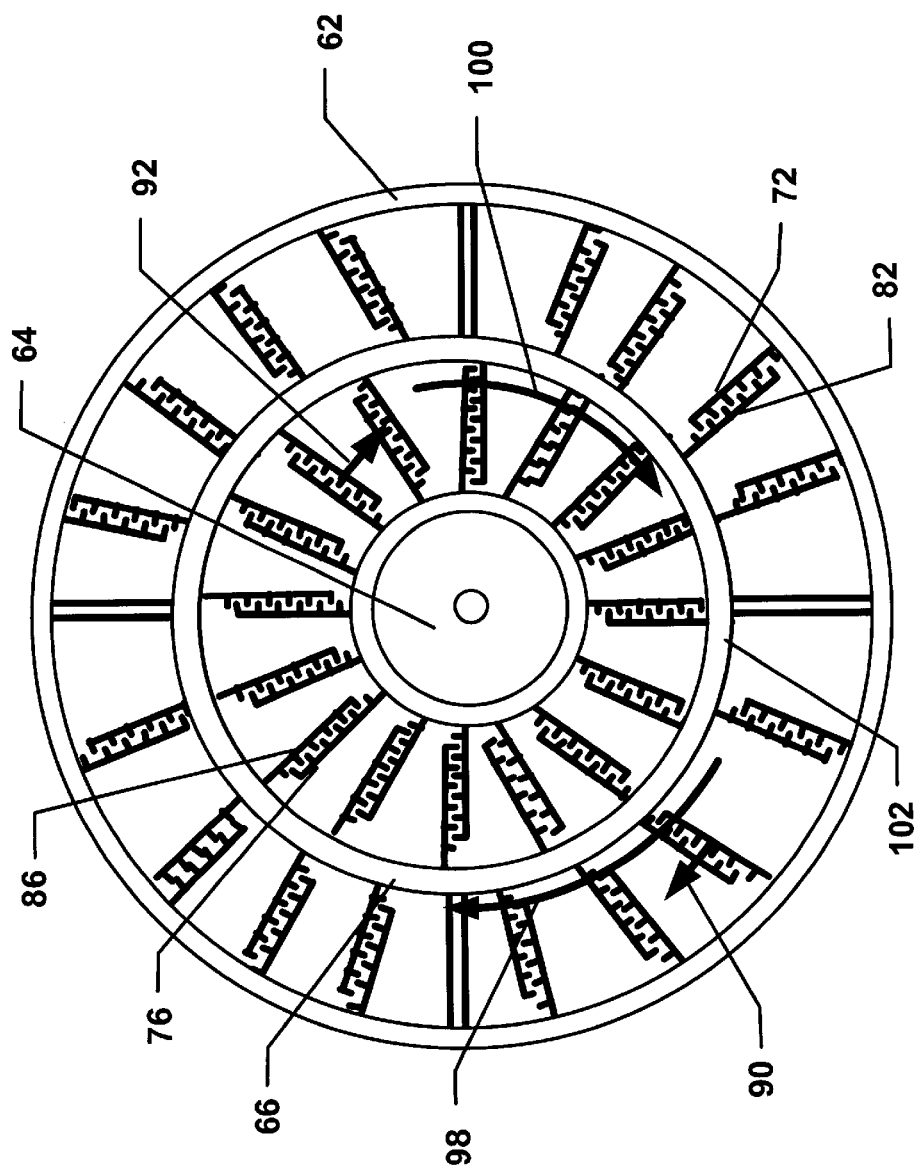
FIG. 10 is a bottom view of the microactuator of FIG. 5, shown with force diagram during a track-follow control actuator.

With reference to FIG. 10, the electrostatic forces 90 and 92 that are formed between each pair of the outer stator radial spokes 72 and the outward rotor radial spokes 82, and between each pair of the inner stator radial spokes 76 and the inward rotor radial spokes 86, respectively, act in the clockwise circumferential direction of the microactuator 60 of the preferred embodiment. In this manner, the electrostatic forces 90 and 92 collectively form two force couples that result in a clockwise acting torque 98 between the outer stator 62 and the rotor 66 and a clockwise acting torque 100 between the inner stator 64 and the rotor 66. In turn, these clockwise acting resultant torques 98 and 100 reinforce each other to form a clockwise acting driving torque 102 that actuates the rotor 66 in a clockwise rotation.

Figure 11:
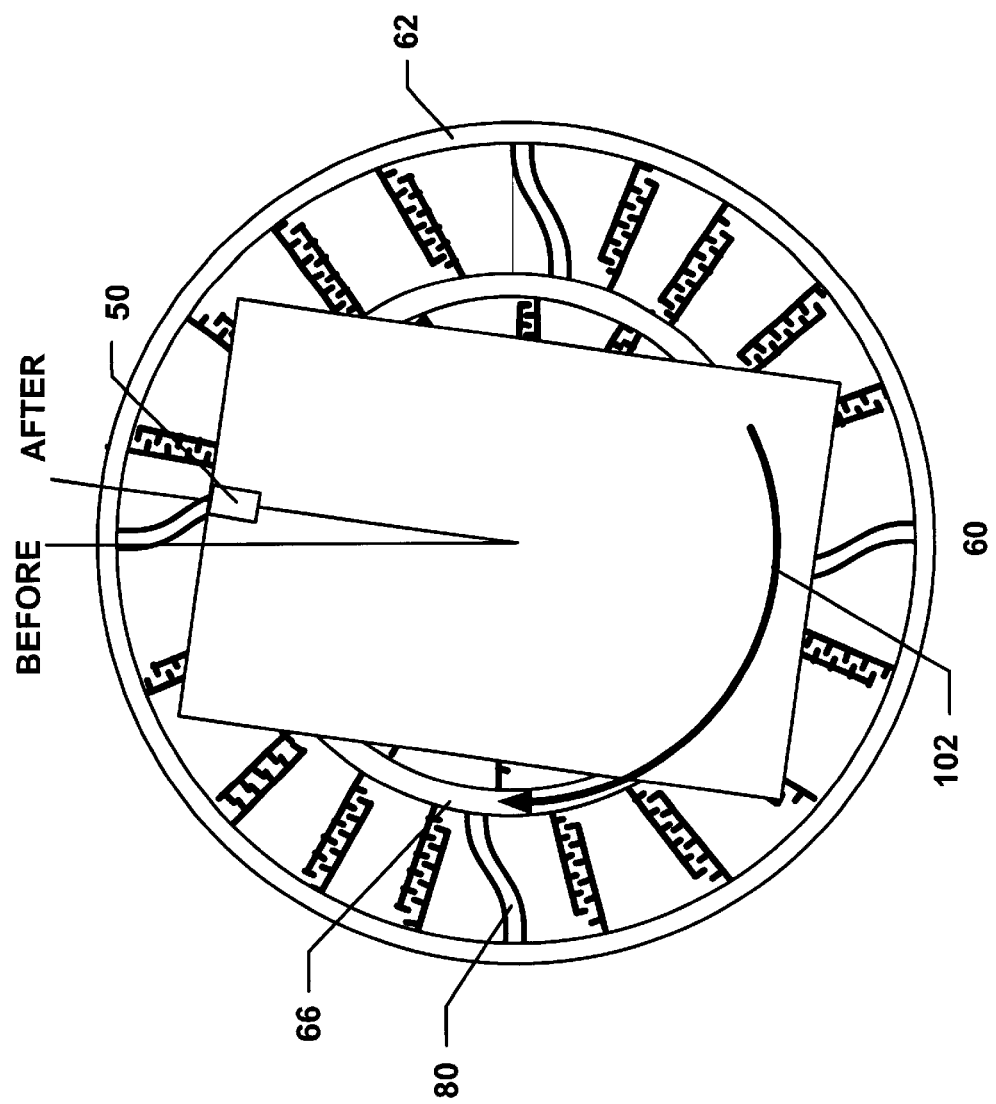
FIG. 11 is a bottom view of the slider of FIG. 2 after a track-follow control actuation.

Referring now to FIG. 11, the clockwise acting driving torque 102 causes the elastic springs 80 to stretch and deflect correspondingly forming counter-clockwise restoring forces. When the driving voltage is removed, the spring forces dominate and act to return the fingers to their un-actuated positions. The clockwise rotation of the rotor 66 brings about the same rotation of the slider 47, which is attached to the rotor 66 via the protective cap 104. The resulting clockwise rotation of the slider 47 allows the read/write element 50 to be positioned at a desired location within a target data track.

The advantages of the microactuator 60 of the present invention over the conventional microactuator 360 of the prior art now become apparent as described subsequently. The incorporation of the inner stator 64 in the microactuator 60 of the present invention effectively reduces the length of the elastic springs 80 by a factor of two as compared to the elastic springs 374 of the conventional microactuator 360 of the prior art without a necessity of increasing the size of the rotor 66. In fact, the rotor 66 can be made lighter than the inner rotor 364 of the conventional microactuator 360 of the prior art by varying the wall thickness of the rotor 66.

The reduction in length of the elastic springs 80 brings about several beneficial consequences with respect to the performance of the microactuator 60 of the present invention. The halving of the length of the elastic springs 80 effectively doubles the extensional stiffness of the elastic springs 80 and increases the flexural stiffness of the elastic springs 80 by a factor of 8. Since the rotor 66 is actuated in a rotational direction, the flexural stiffness of the elastic springs 80 is of a greater significance than the extensional stiffness of the elastic springs 80, which governs the lateral motion of the rotor 66. As a result, the natural frequencies of the rotor 66 in the rotational direction nearly triples the natural frequencies of the rotor 364 of the conventional microactuator 360 of the prior art. The substantial gain in the natural frequencies of the rotor 66 translates into many advantages.

Among these advantages is the accompanied gain in the frequency response of the track-follow control, which enables the track-follow control to command a more rapid actuation to effect the high resolution positioning of the read/write head 35, thus resulting in a substantially shorter seek time as needed for a competitive advantage. The increases in the extensional and flexural stiffnesses of the elastic springs 80 greatly enhance the protection of the microactuator 60 of the present invention from external shock and vibration, which could adversely affect the performance of the read/write head 35 and result in unwanted side-writing effect. Furthermore, the same increases in stiffnesses of the elastic springs 80 also result in a substantial reduction in the potential excitation of the suspension arm assembly 33 in the load beam mode since the potential oscillation of the rotor 66 is greatly minimized.

Figure 12:
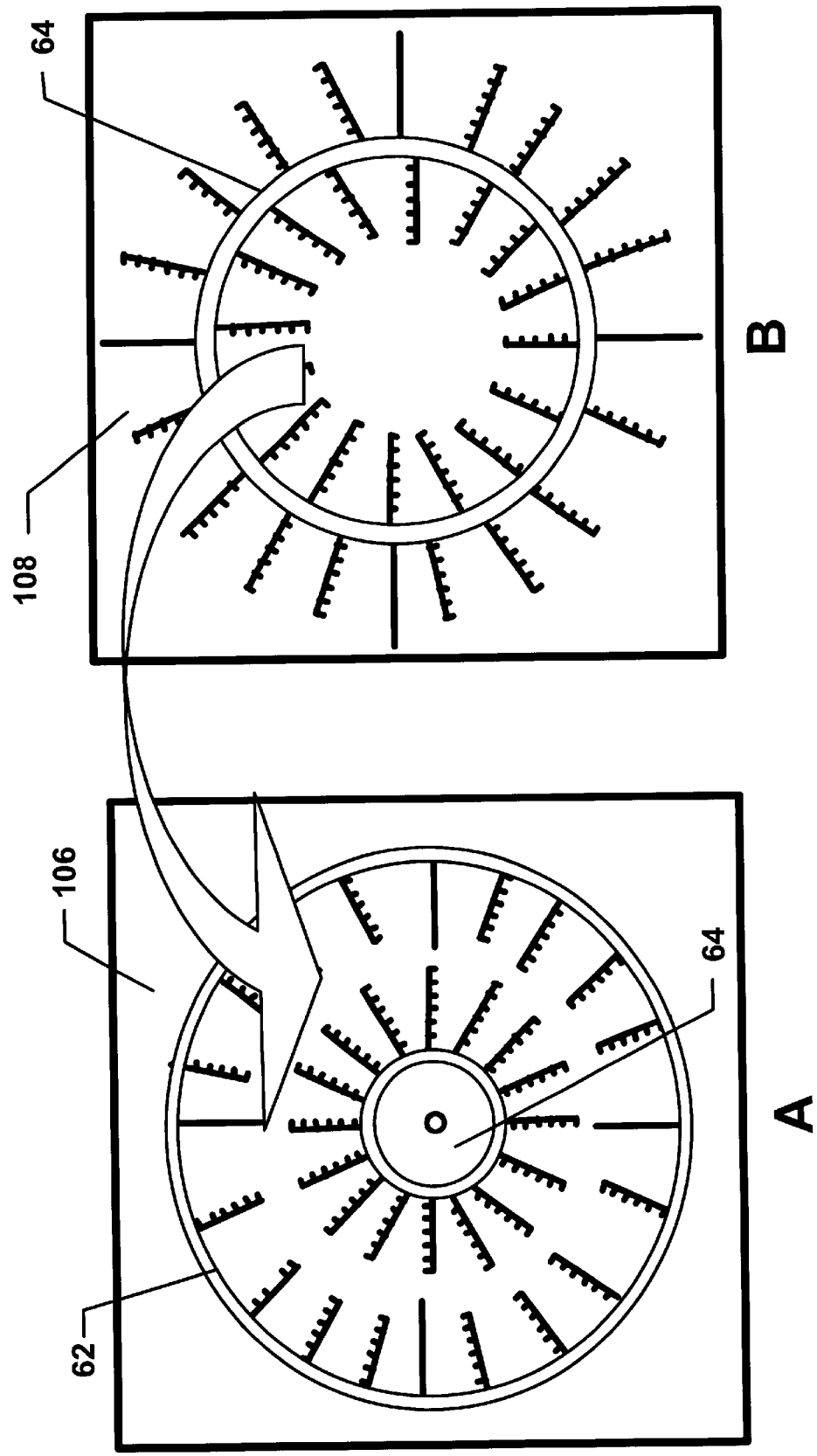
FIG. 12 is a schematic diagram of a typical manufacturing sequence of the microactuator of FIG. 5, made according to a preferred embodiment of the present invention.

Referring now to FIGS. 12A and 12B which illustrates a typical manufacturing sequence of the microactuator 60 of the preferred embodiment, the outer stator 62 and inner stator 64 are formed on a wafer 106 using a lithographic etching process as shown in FIG. 12A. Subsequently, the rotor 66 is created on another wafer 108 using the same lithographic etching process as shown in FIG. 12B. Thereafter, the rotor 66 is transferred from the wafer 108 to assemble with the outer stator 62 and inner stator 64 on the wafer 106 to form the microactuator 60 of the preferred embodiment.

In general, the microactuator 60 of the preferred embodiment is referred to as a coupled stator design. This reference can be exhibited by FIG. 7, which illustrates an electrical diagram of the microactuator 60 of the preferred embodiment. Both the outer stator 62 and inner stator 64 are connected to a ground potential, whereas the rotor 66 is at a positive potential. Thus, the electrostatic forces 90 and 92 induced by the electrostatic potential field always act in the same sense. That is, both the electrostatic forces 90 and 92 are attractive. This sameness in the force direction developed in the microactuator 60 of the preferred embodiment results in a coupling between the outer stator 62 and inner stator 64, which limits the ability to customize the actuation forces in ways that would further enhance the microactuator 60 of the preferred embodiment.

Figure 13:
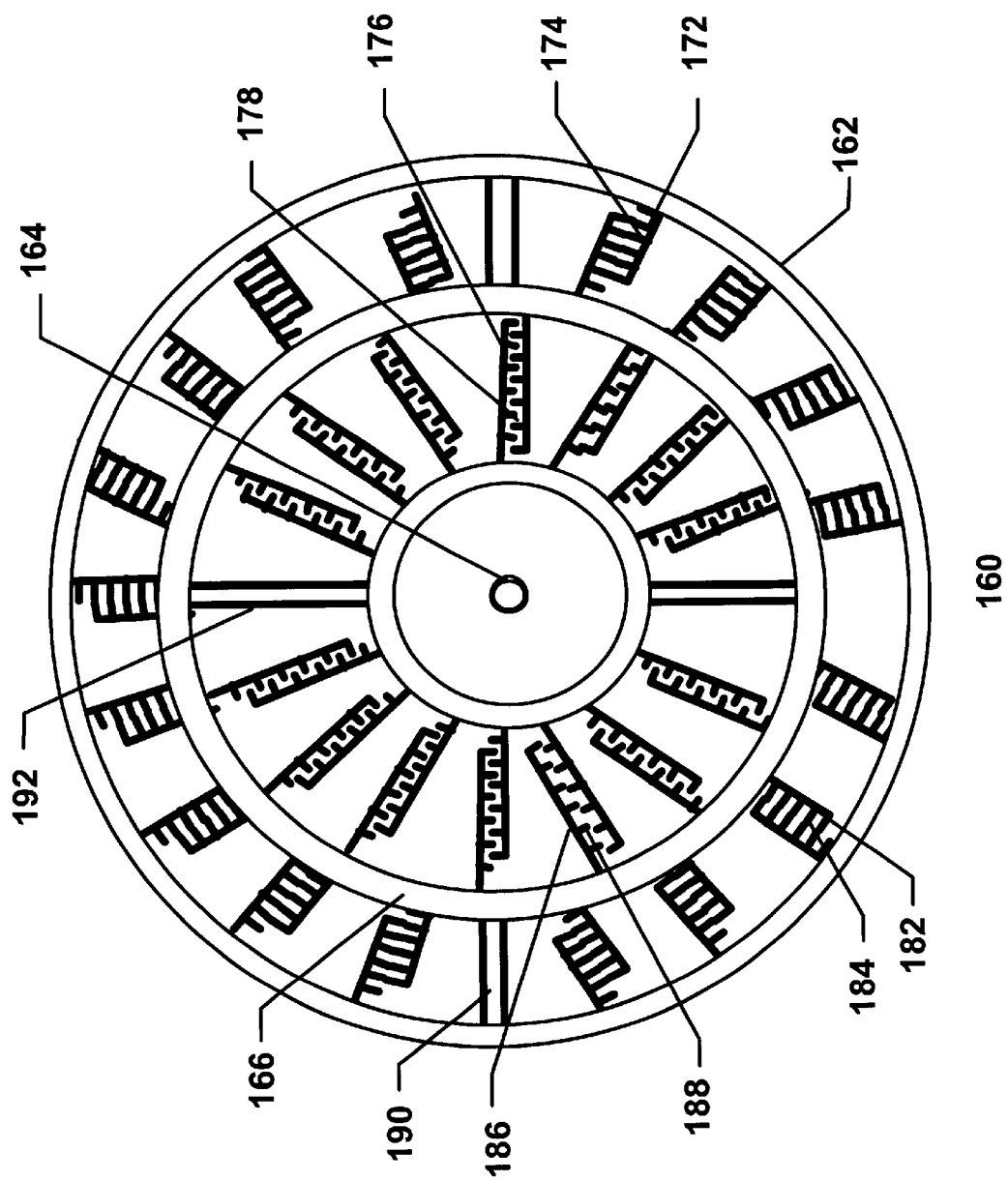
FIG. 13 is a bottom view of a microactuator of FIG. 2 comprised of two stators and a rotor positioned in a close proximity to the outer stator and electrostatically coupled of radial spokes of unequal lengths having a plurality of electrostatically charged comb-like fingers, made according to an alternative embodiment of the present invention.

With reference to FIG. 13, an improved microactuator 160 of an alternative embodiment is introduced. The microactuator 160 is also comprised of an outer stator 162, an inner stator 164, and a rotor 166. In contrast to microactuator 60 of the preferred embodiment, the rotor 166 of the microactuator 160 of the alternative embodiment is positioned closer to the outer stator 162 than the inner stator 164. The outer stator 162 is further comprised of a plurality outer stator radial spokes 172 equally spaced circumferentially except at the 3 and 9 o'clock positions. Each of the outer stator radial spokes 172 is comprised of a plurality outer stator fingers 174 that point in a counterclockwise direction.

Similarly, the inner stator 164 is comprised of a plurality of inner stator radial spokes 176 equally spaced circumferentially except at 12 and 6 o'clock positions. Each of the inner stator radial spokes 176 is further comprised of a plurality inner stator fingers 178 the point in a clockwise direction. Thus, orientations of the outer stator fingers 172 and the inner stator fingers 178 are in the opposing sense, in contrast to the outer stator fingers 72 and inner stator fingers 78 in the microactuator 60 of the preferred embodiment. Further, the outer stator radial spokes 172 are shorter than the inner stator radial spokes 176 as a result of the rotor 166 being closer to the outer stator 162 than the inner stator 164.

The rotor 166 is comprised of a plurality of outward rotor radial spokes 182 that alternate with the outer stator radial spokes 172 and a plurality of inward rotor radial spokes 186 that alternate with the inner stator radial spokes 176. Each of the outward rotor radial spokes 182 is further comprised of a plurality of outward rotor fingers 184 that point in a clockwise direction opposing the outer stator fingers 174. Similarly, each of the inward rotor radial spokes 186 is comprised of a plurality of inward rotor fingers 188 that point in a counterclockwise direction opposing the inner stator fingers 178. Further, the outward rotor radial spokes 182 are shorter than the inward rotor radial spokes 186.

The rotor 166 is elastically attached to two outer elastic springs 190 that anchor to the outer stator 162 at the 3 and 9 o'clock positions and two inner elastic springs 192 that anchor to the inner stator 164 at the 12 and 6 o'clock positions.

Figure 14:
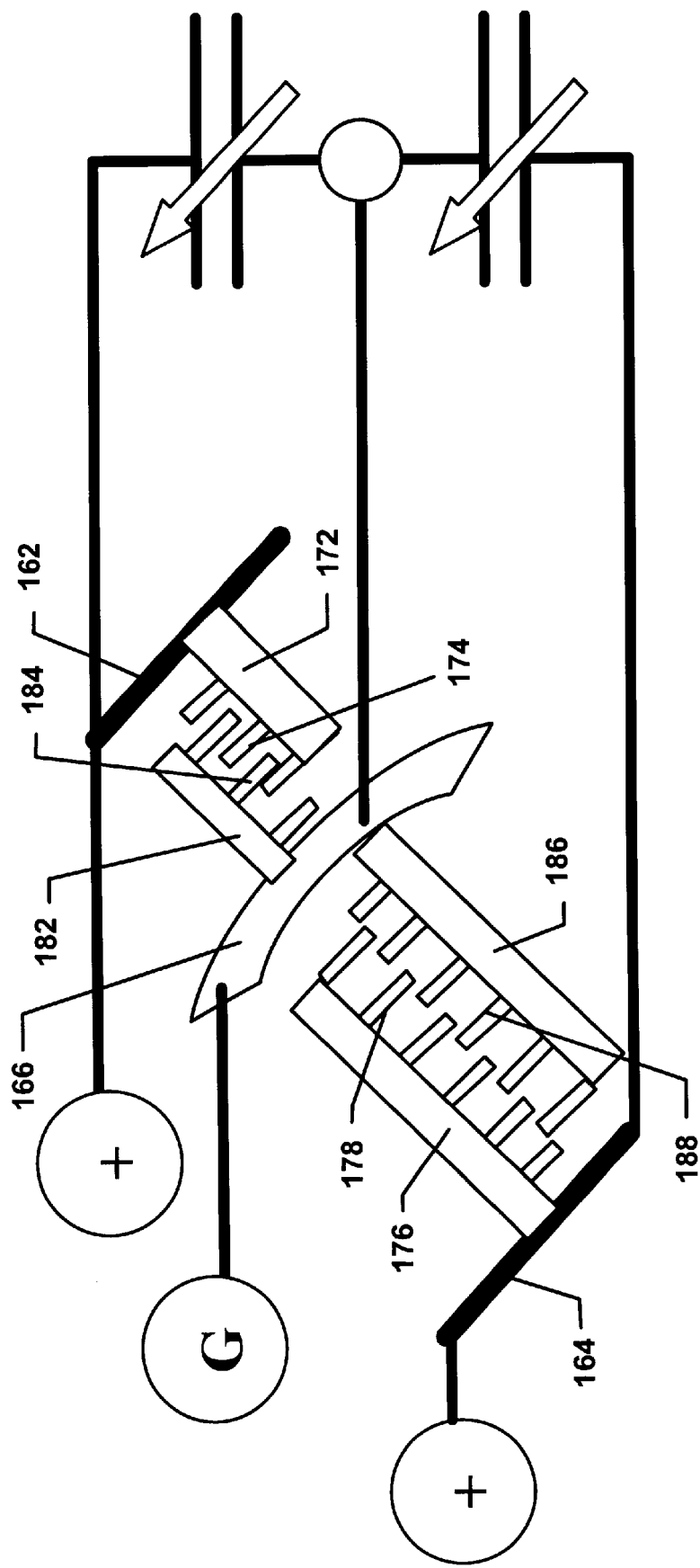
FIG. 14 illustrates an electrical diagram of the radial spokes of the microactuator of FIG. 13, made according to an alternative embodiment of the present invention.

Referring now to FIG. 14 which illustrates an electrical diagram of the microactuator 160 of the alternative embodiment, both the outer stator 162 and the inner stator 164 are now connected to a positive potential, whereas the rotor 166 is at a ground potential. This electrical arrangement effectively decouples the outer stator 162 and the inner stator 164 from each other. This decoupling results in a beneficial effect in that the induced electrostatic forces between the outer stator 162 and the rotor 166 and between the inner stator 164 and the rotor 166 can de independently controlled.

Figure 15:
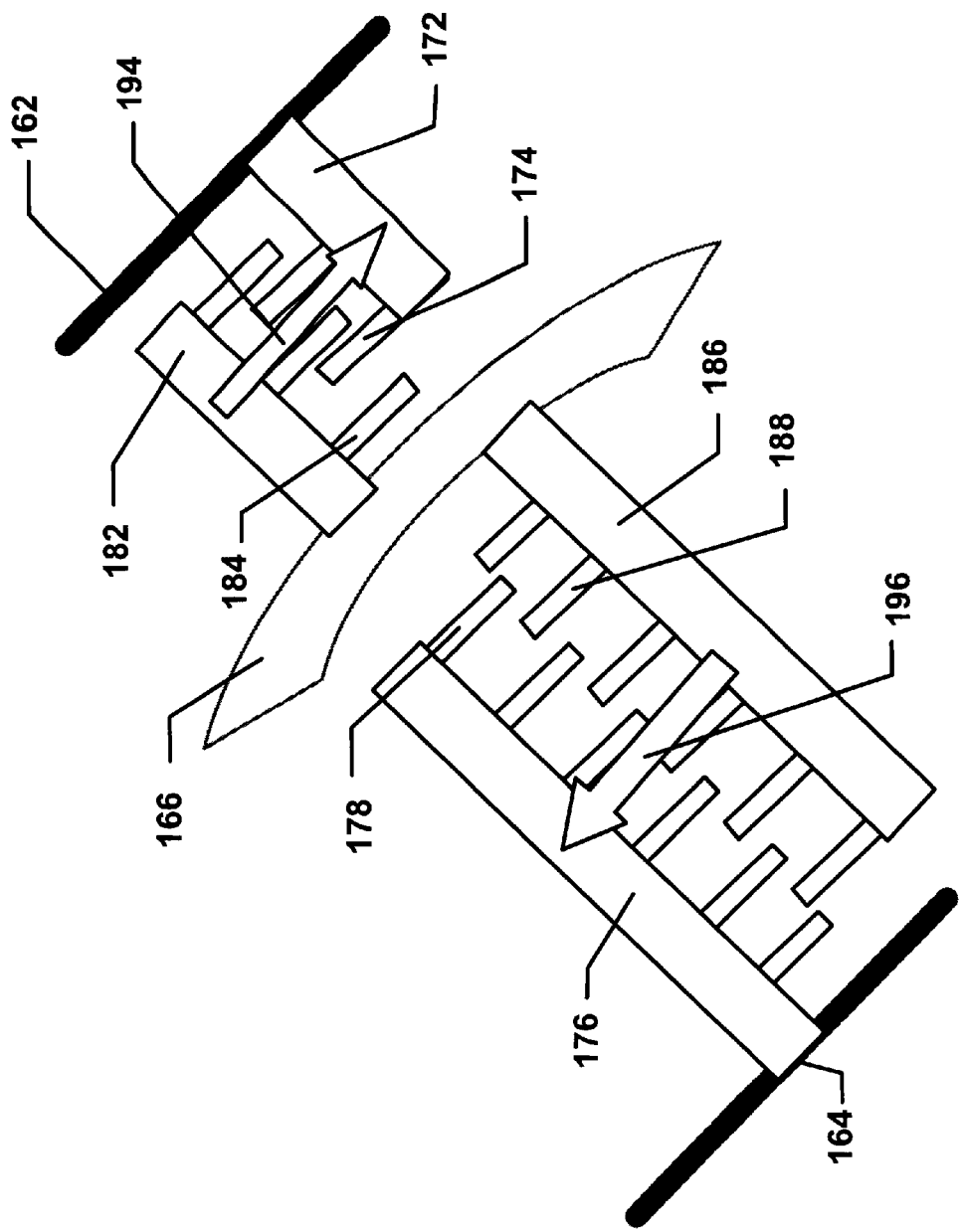
FIG. 15 is a diagram illustrating electrostatic transverse forces engaged between the comb-like fingers attached to the radial spokes of the microactuator of FIG. 13, made according to an alternative embodiment of the present invention.

With reference to FIG. 15, during a track-follow control actuation, the voltage command is split into two different voltages to be sent to the outer stator 162 and the inner stator 164. The electrostatic potential field induces an electrostatic force 194 between each pair of the outer stator radial spokes 172 and the outward rotor radial spokes 182, and an electrostatic force 196 between the inner stator radial spokes 176 and the inward rotor radial spokes 186. Further, these electrostatic forces 194 and 196 can be independently controlled in amplitude by adjusting the amplitude of the two split voltages accordingly. This independent force control enables a wider range of latitude in the performance of the microactuator 160 of the alternative embodiment by customizing the electrostatic forces 194 and 196. The electrostatic forces 194 and 196 act in opposite directions to offset the driving torque without the need to reduce the voltage command. This mode of force actuation, in fact, can significantly improve the stability of the track-follow control.

Figure 16:
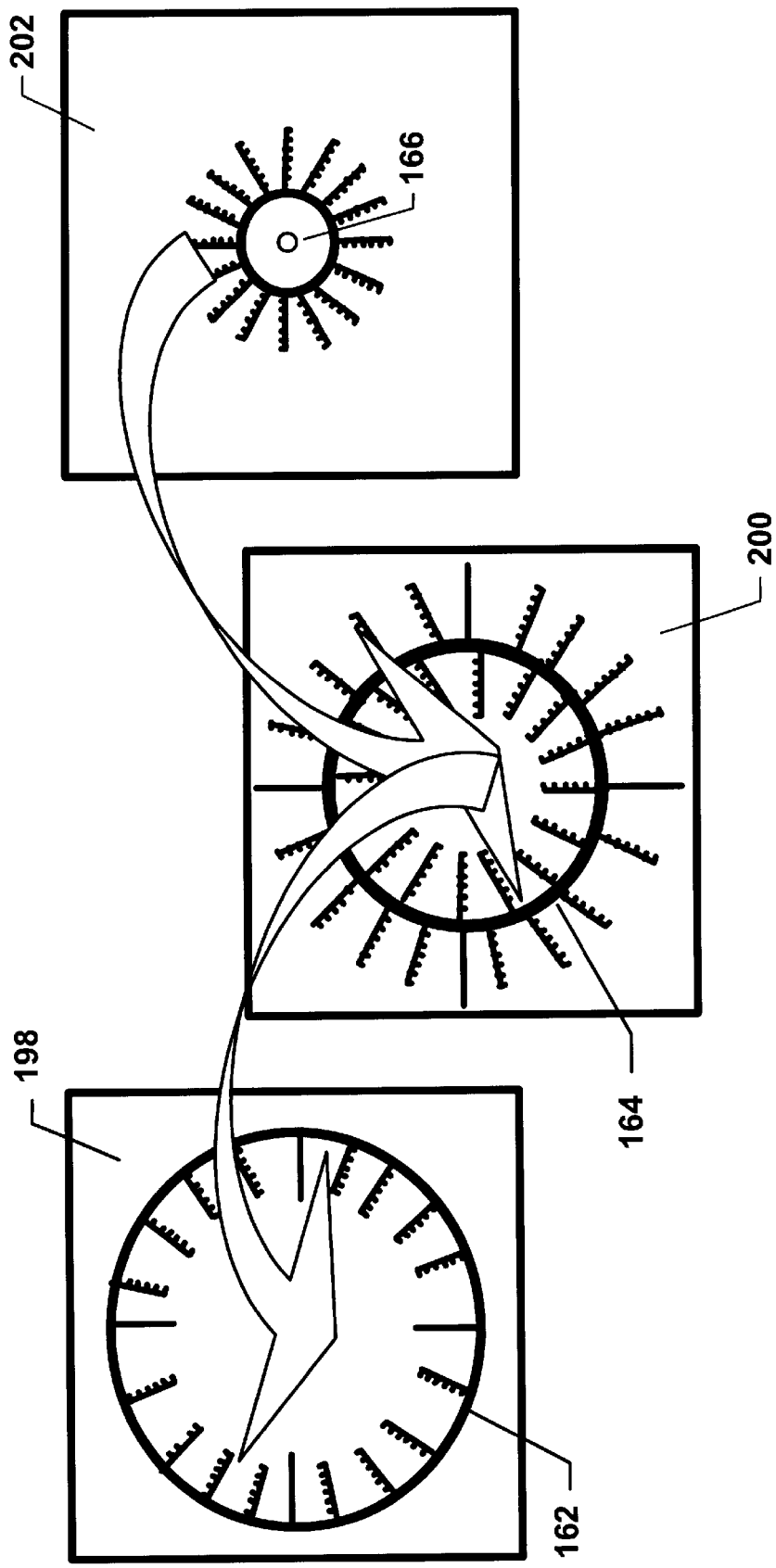
FIG. 16 is a schematic diagram of a typical manufacturing sequence of the microactuator of FIG. 13, made according to an alternative embodiment of the present invention.

Referring now to FIG. 16 which illustrates a manufacturing sequence of the microactuator 160 of the alternative embodiment, the outer stator 162 is created on a wafer 198 using a lithographic etching process. The rotor 166 and the inner stator 164 are then created on wafers 200 and 202, respectively, using the same lithographic etching process. Thereupon, the inner stator 164 is transferred from the wafer 202 to assemble with the rotor 166 on the wafer 200. Thereafter, the rotor 166/inner stator 164 assembly is transferred from the wafer 200 to assemble with the outer stator 162 on the wafer 198 to form the microactuator 160 of the alternative embodiment.

Figure 17:
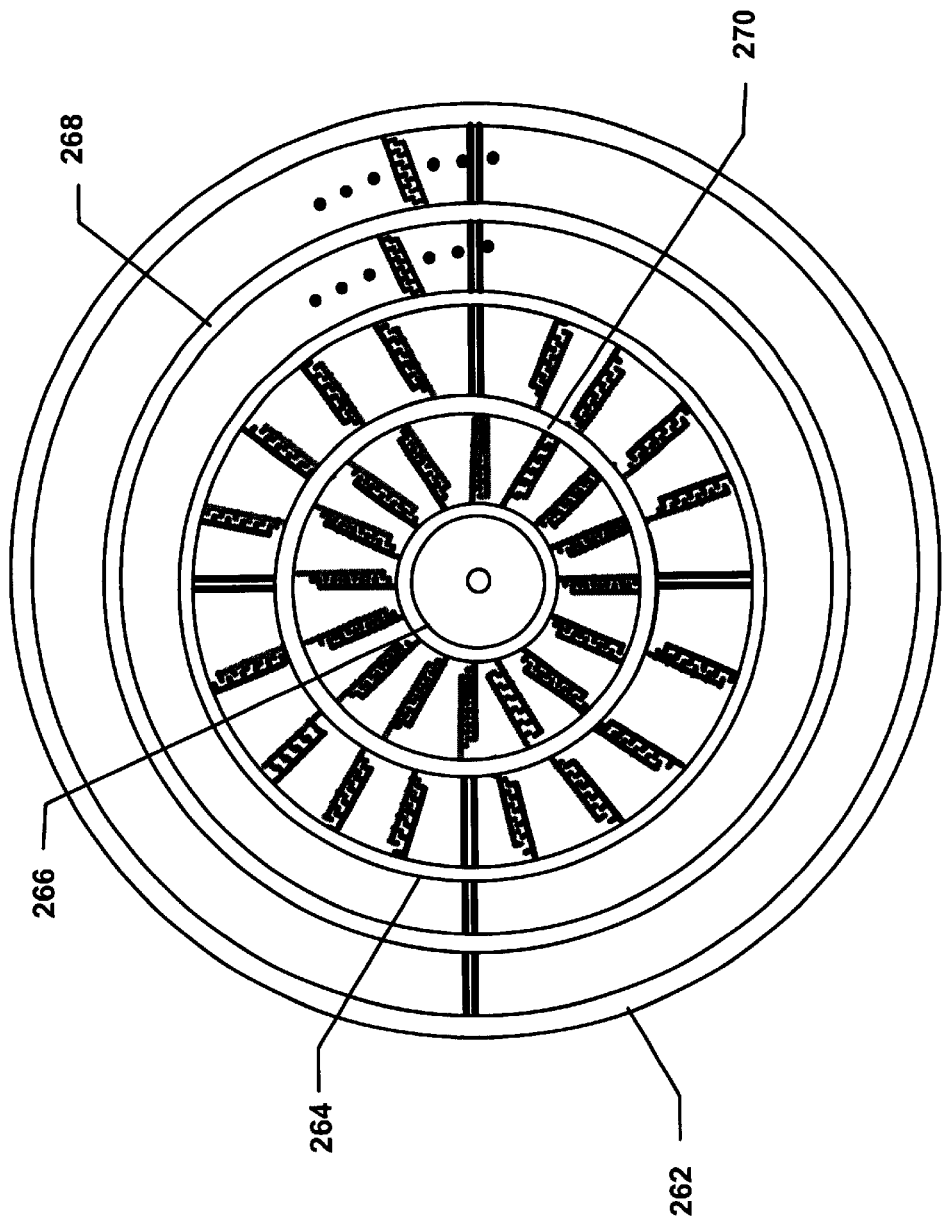
FIG. 17 is a bottom view of a microactuator of FIG. 2 comprised of a plurality of stators alternating with a plurality of rotors electrostatically coupled of radial spokes of equal lengths having a plurality of electrostatically charged comb-like fingers, made according to another alternative embodiment of the present invention.

The alternative embodiment may be modified substantially to provide a new embodiment. With reference to FIG. 17, a microactuator 260 of another alternative embodiment of the present invention is now introduced. The microactuator 260 is comprised of a plurality of stators alternating with a plurality of rotors. For example, the microactuator 260 is shown in FIG. 17 as being comprised of three stators 262, 264, and 266; and two rotors 268 and 270 alternating with the stators 262, 264, and 266. The rotors 268 and 270 may be positioned midway between two adjacent stators as shown, or closer to one stator than the other. The various fingers of the stators 262, 264, and 266, and the rotors 268 and 270 may be oriented suitably in various manners such as those in the microactuator 60 of the preferred embodiment or the microactuator 160 of the earlier alternative embodiment of the present invention.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment. For example, though the stators and the rotors have been described as having a generally circular shape, it should be appreciated that other shapes can alternatively be used.

What is claimed is:

1. A data storage system comprising:

a head;

a microelectromechanical actuator that is secured to the head to effect fine positioning of the head, and which comprises a rotor that is electrostatically coupled to an inner stator and an outer stator;

the rotor comprises a set of movable inner radial spokes and a set of movable outer radial spokes that are disposed on opposite sides of the rotor;

the rotor further comprises a set of inner movable electrodes and a set of outer movable electrodes that extend from, and that are arranged substantially perpendicularly relative to the inner and outer movable radial spokes, respectively;

the inner stator comprises a plurality of outwardly extending inner radial spokes and a plurality of inner electrodes that are arranged substantially perpendicularly relative to the inner radial spokes and that are interleaved with the inner movable electrodes;

the outer stator comprises a plurality of inwardly extending outer radial spokes and a plurality of outer electrodes that are arranged substantially perpendicularly relative to the outer radial spokes and that are interleaved with the outer movable electrodes; and wherein the inner radial spokes of the inner stator ore mostly equidistally distributed.

2. A data storage system comprising:

a head;

a microelectromechanical actuator that is secured to the head to effect fine positioning of the head, and which comprises a rotor that is electrostatically coupled to an inner stator and an outer stator;

the rotor comprises a set of movable inner radial spokes and a set of movable outer radial spokes that are disposed on opposite sides of the rotor;

the rotor further comprises a set of inner movable electrodes and a set of outer movable electrodes that extend from, and that are arranged substantially perpendicularly relative to the inner and outer movable radial spokes, respectively;

the inner stator comprises a plurality of outwardly extending inner radial spokes and a plurality of inner electrodes that are arranged substantially perpendicularly relative to the inner radial spokes and that are interleaved with the inner movable electrodes;

the outer stator comprises a plurality of inwardly extending outer radial spokes and a plurality of outer electrodes that are arranged substantially perpendicularly relative to the outer radial spokes and that are interleaved with the outer movable electrodes; and wherein the outer radial spokes of the outer stator are mostly equidistally distributed.

3. A data storage system comprising:

a head;

a microelectromechanical actuator that is secured to the head to effect fine positioning of the head, and which comprises a rotor that is electrostatically coupled to an inner stator and an outer stator;

the rotor comprises a set of movable inner radial spokes and a set of movable outer radial spokes that are disposed on opposite sides of the rotor;

the rotor further comprises a set of inner movable electrodes and a set of outer movable electrodes that extend from, and that are arranged substantially perpendicularly relative to the inner and outer movable radial spokes, respectively;

the inner stator comprises a plurality of outwardly extending inner radial spokes and a plurality of inner electrodes that are arranged substantially perpendicularly relative to the inner radial spokes and that are interleaved with the inner movable electrodes;

the outer stator comprises a plurality of inwardly extending outer radial spokes and a plurality of outer electrodes that are arranged substantially perpendicularly relative to the outer radial spokes and that are interleaved with the outer movable electrodes; and wherein the inner movable radial spokes of the rotor are mostly equidistally distributed.

4. A data storage system comprising:

a head;

a microelectromechanical actuator that is secured to the head to effect fine positioning of the head, and which comprises a rotor that is electrostatically coupled to an inner stator and an outer stator;

the rotor comprises a set of movable inner radial spokes and a set of movable outer radial spokes that are disposed on opposite sides of the rotor;

the rotor further comprises a set of inner movable electrodes and a set of outer movable electrodes that extend from, and that are arranged substantially perpendicularly relative to the inner and outer movable radial spokes, respectively;

the inner stator comprises a plurality of outwardly extending inner radial spokes and a plurality of inner electrodes that are arranged substantially perpendicularly relative to the inner radial spokes and that are interleaved with the inner movable electrodes;

the outer stator comprises a plurality of inwardly extending outer radial spokes and a plurality of outer electrodes that are arranged substantially perpendicularly relative to the outer radial spokes and that are interleaved with the outer movable electrodes; and wherein the outer movable radial spokes of the rotor are mostly equidistally distributed.

5. A data storage system comprising:

a head;

a microelectromechanical actuator that is secured to the head to effect fine positioning of the head, and which comprises a rotor that is electrostatically coupled to an inner stator and an outer stator;

the rotor comprises a set of movable inner radial spokes and a set of movable outer radial spokes that are disposed on opposite sides of the rotor;

the rotor further comprises a set of inner movable electrodes and a set of outer movable electrodes that extend from, and that are arranged substantially perpendicularly relative to the inner and outer movable radial spokes, respectively;

the inner stator comprises a plurality of outwardly extending inner radial spokes and a plurality of inner electrodes that are arranged substantially perpendicularly relative to the inner radial spokes and that are interleaved with the inner movable electrodes;

the outer stator comprises a plurality of inwardly extending outer radial spokes and a plurality of outer electrodes that are arranged substantially perpendicularly relative to the outer radial spokes and that are interleaved with the outer movable electrodes; and wherein the inner stator comprises a substantially circular disk secured to a base.

6. The system of claim 5, wherein the rotor comprises a substantially circular ring positioned concentrically between the outer stator and inner stator.

7. The system of claim 6, further comprising at least one elastic member that connects the rotor and the outer stator.

8. The system of claim 7, further comprising at least one elastic member that connects the rotor and the inner stator.

9. A microelectromechanical actuator to effect fine positioning, comprising:

a rotor that is electrostatically coupled to an inner stator and an outer stator;

the rotor comprises a set of movable inner radial spokes and a set of movable outer radial spokes that are disposed on opposite sides of the rotor;

the rotor further comprises a set of inner movable electrodes and a set of outer movable electrodes that extend from, and that are arranged substantially perpendicularly relative to the inner and outer movable radial spokes, respectively;

the inner stator comprises a plurality of outwardly extending inner radial spokes and a plurality of inner electrodes that are arranged substantially perpendicularly relative to the inner radial spokes and that are interleaved with the inner movable electrodes; and the outer stator comprises a plurality of inwardly extending outer radial spokes and a plurality of outer electrodes that are arranged substantially perpendicularly relative to the outer radial spokes and that are interleaved with the outer movable electrodes; and wherein the inner radial spokes of the inner stator are mostly equidistally distributed.

10. A microelectromechanical actuator to effect fine positioning, comprising:

a rotor that is electrostatically coupled to an inner stator and an outer stator;

the rotor comprises a set of movable inner radial spokes and a set of movable outer radial spokes that are disposed on opposite sides of the rotor;

the rotor further comprises a set of inner movable electrodes and a set of outer movable electrodes that extend from, and that are arranged substantially perpendicularly relative to the inner and outer movable radial spokes, respectively;

the inner stator comprises a plurality of outwardly extending inner radial spokes and a plurality of inner electrodes that are arranged substantially perpendicularly relative to the inner radial spokes and that are interleaved with the inner movable electrodes; and the outer stator comprises a plurality of inwardly extending outer radial spokes and a plurality of outer electrodes that are arranged substantially perpendicularly relative to the outer radial spokes and that are interleaved with the outer movable electrodes; and wherein the outer radial spokes of the outer stator are mostly equidistally distributed.

11. A microelectromechanical actuator to effect fine positioning, comprising:

a rotor that is electrostatically coupled to an inner stator and an outer stator;

the rotor comprises a set of movable inner radial spokes and a set of movable outer radial spokes that are disposed on opposite sides of the rotor;

the rotor further comprises a set of inner movable electrodes and a set of outer movable electrodes that extend from, and that are arranged substantially perpendicularly relative to the inner and outer movable radial spokes, respectively;

the inner stator comprises a plurality of outwardly extending inner radial spokes and a plurality of inner electrodes that are arranged substantially perpendicularly relative to the inner radial spokes and that are interleaved with the inner movable electrodes; and the outer stator comprises a plurality of inwardly extending outer radial spokes and a plurality of outer electrodes that are arranged substantially perpendicularly relative to the outer radial spokes and that are interleaved with the outer movable electrodes; and wherein the inner movable radial spokes of the rotor are mostly equidistally distributed.

12. A microelectromechanicol actuator to effect fine positioning, comprising:
- a rotor that is electrostatically coupled to an inner stator and an outer stator;
- the rotor comprises a set of movable inner radial spokes and a set of movable outer radial spokes that are disposed on opposite sides of the rotor;
- the rotor further comprises a set of inner movable electrodes and a set of outer movable electrodes that extend from, and that are arranged substantially perpendicularly relative to the inner and outer movable radial spokes, respectively;
- the inner stator comprises a plurality of outwardly extending inner radial spokes and a plurality of inner electrodes that are arranged substantially perpendicularly relative to the inner radial spokes and that are interleaved with the inner movable electrodes; and
- the outer stator comprises a plurality of inwardly extending outer radial spokes and a plurality of outer electrodes that are arranged substantially perpendicularly relative to the outer radial spokes and that are interleaved with the outer movable electrodes; and
- wherein the outer movable radial spokes of the rotor are mostly equidistally distributed.

13. A microelectromechanical actuator to effect fine positioning, comprising:
- a rotor that is electrostatically coupled to an inner stator and an outer stator;
- the rotor comprises a set of movable inner radial spokes and a set of movable outer radial spokes that are disposed on opposite sides of the rotor;
- the rotor further comprises a set of inner movable electrodes and a set of outer movable electrodes that extend from, and that are arranged substantially perpendicularly relative to the inner and outer movable radial spokes, respectively;
- the inner stator comprises a plurality of outwardly extending inner radial spokes and a plurality of inner electrodes that are arranged substantially perpendicularly relative to the inner radial spokes and that are interleaved with the inner movable electrodes; and
- the outer stator comprises a plurality of inwardly extending outer radial spokes and a plurality of outer electrodes that are arranged substantially perpendicularly relative to the outer radial spokes and that are interleaved with the outer movable electrodes; and
- wherein the inner stator includes a substantially circular disk secured to a base.

14. The microelectromechanical actuator of claim 13, wherein the rotor comprises a substantially circular ring positioned concentrically between the outer stator and inner stator.

15. The microelectromechanical actuator of claim 14, further comprising at least one elastic member that connects the rotor and the outer stator.

16. The microelectromechanical actuator of claim 15, further comprising at least one elastic member that connects the rotor and the inner stator.

* * * * *